(12) United States Patent
Roth et al.

(10) Patent No.: US 6,738,152 B1
(45) Date of Patent: May 18, 2004

(54) EVENT-BASED PRINTING

(75) Inventors: Tim H. Roth, Issaquah, WA (US); Paul Holland, Issaquah, WA (US)

(73) Assignee: Adobe Systems, Incorporated, San Jose, CA (US)

( * ) Notice: Subject to any disclaimer, the term of this patent is extended or adjusted under 35 U.S.C. 154(b) by 0 days.

(21) Appl. No.: 09/210,144

(22) Filed: Dec. 11, 1998

(51) Int. Cl.$^7$ .............................. G06F 15/00; G06K 1/00
(52) U.S. Cl. ...................... 358/1.14; 358/1.1; 358/1.14; 358/1.13; 358/487; 382/298; 382/173; 382/284; 382/258; 382/112; 707/526
(58) Field of Search ................................. 382/298, 173, 382/284, 258, 112; 358/487, 1.1, 1.14, 1.13; 707/526

(56) References Cited

U.S. PATENT DOCUMENTS

| | | | | |
|---|---|---|---|---|
| 5,768,487 A | * | 6/1998 | LeClair et al. | 358/1.17 |
| 5,790,664 A | * | 8/1998 | Coley et al. | 709/203 |
| 5,999,707 A | * | 12/1999 | Taniguchi et al. | 358/1.13 |
| 6,023,556 A | * | 2/2000 | Ledgard et al. | 358/1.2 |
| 6,115,132 A | * | 9/2000 | Nakatsuma et al. | 358/1.14 |
| 6,317,217 B1 | * | 11/2001 | Toda | 358/1.11 |
| 6,335,795 B1 | * | 1/2002 | Neuhard et al. | 358/1.15 |

FOREIGN PATENT DOCUMENTS

| | | |
|---|---|---|
| EP | 0 782 068 A1 | 7/1997 |
| EP | 0 854 415 A2 | 7/1998 |

OTHER PUBLICATIONS

"Programming Windows 95," Charles Petzold, Microsoft Press, 1996.
"Imaging With Quickdraw," Addison–Wesley Publishing Company, 1994.

* cited by examiner

Primary Examiner—Kimberly Williams
Assistant Examiner—Ashanti Ghee
(74) Attorney, Agent, or Firm—Fish & Richardson P.C.

(57) ABSTRACT

Methods and apparatus implementing a technique for printing to a selected destination in a computer system. A centralized print manager provides the implementation and control of operation for print services, such as tile printing or color separations. In general, in one aspect, the technique includes: generating print events to provide a specific print service to a client application, where the print events request information from the client application according to the specific print service; and receiving responses to the print events from the client application, where at least one response includes print data to be printed to a destination.

53 Claims, 4 Drawing Sheets

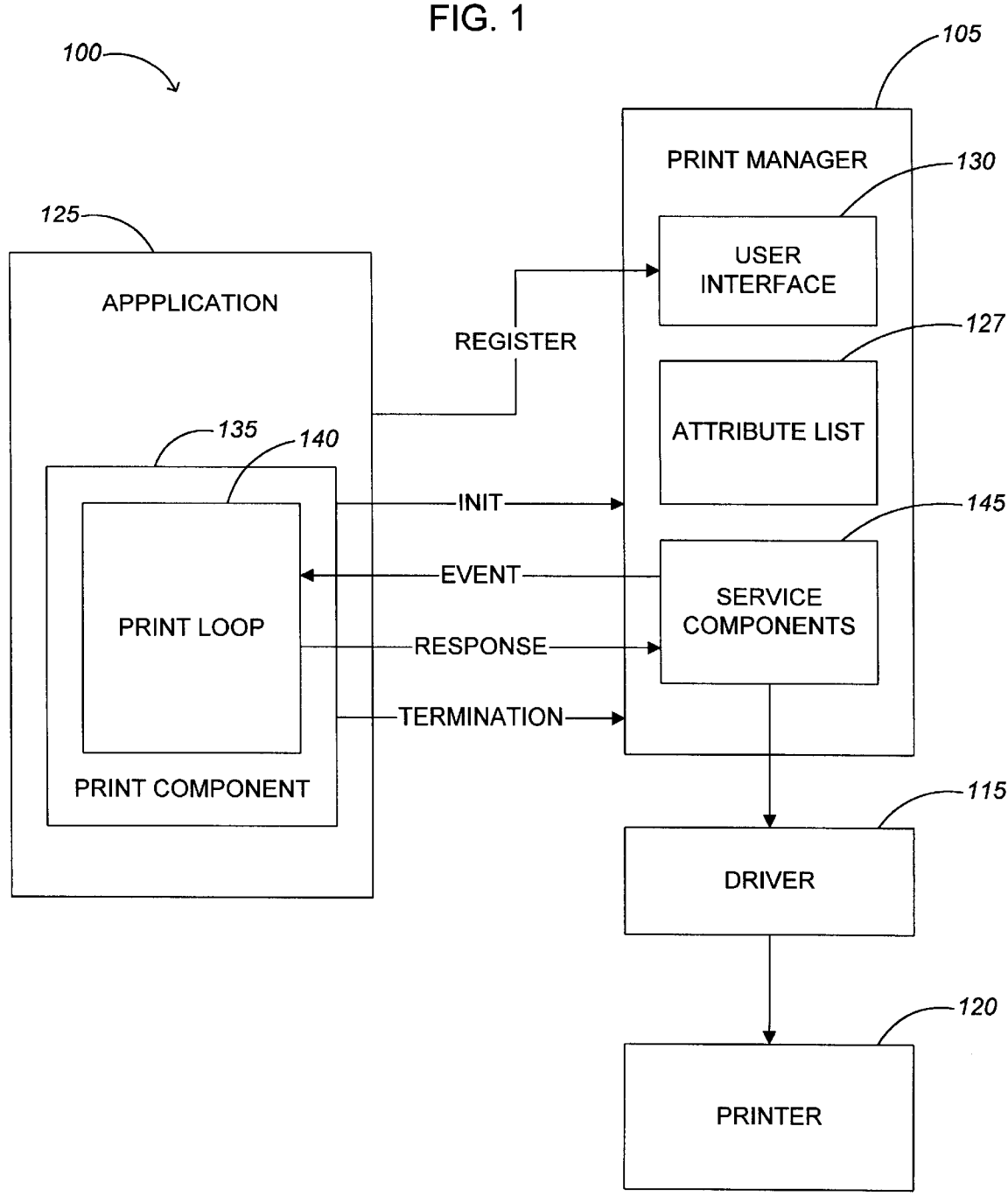

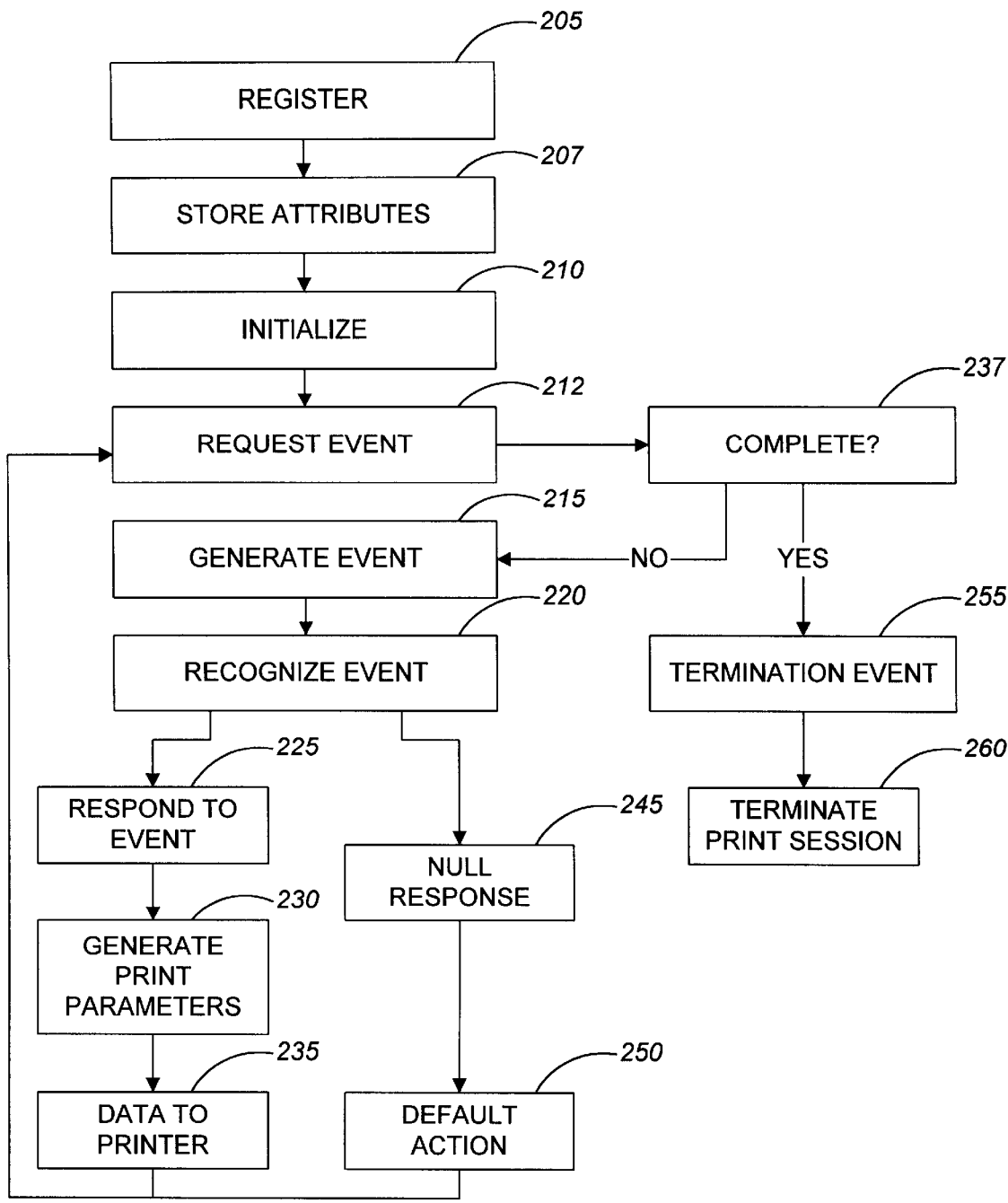

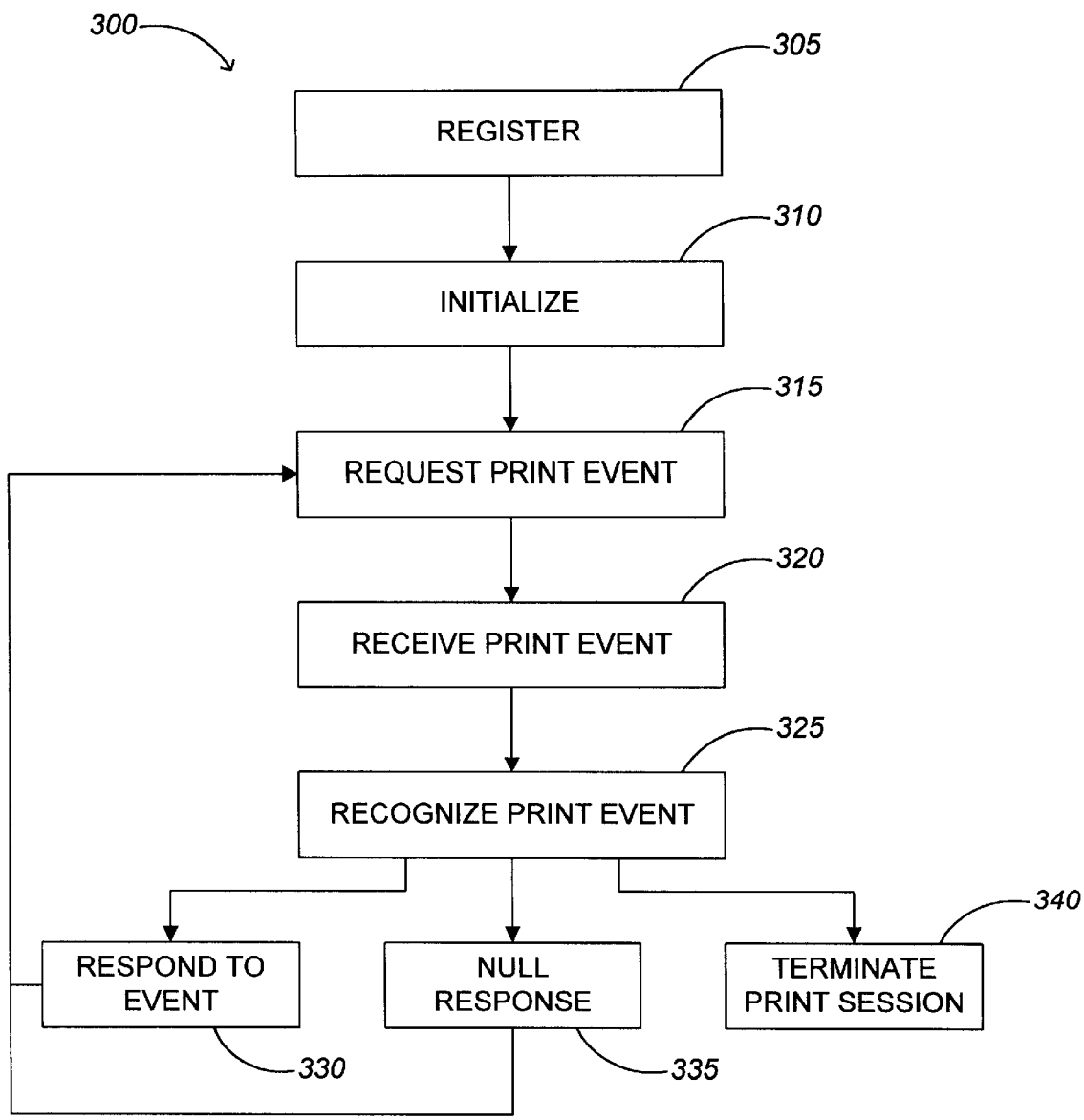

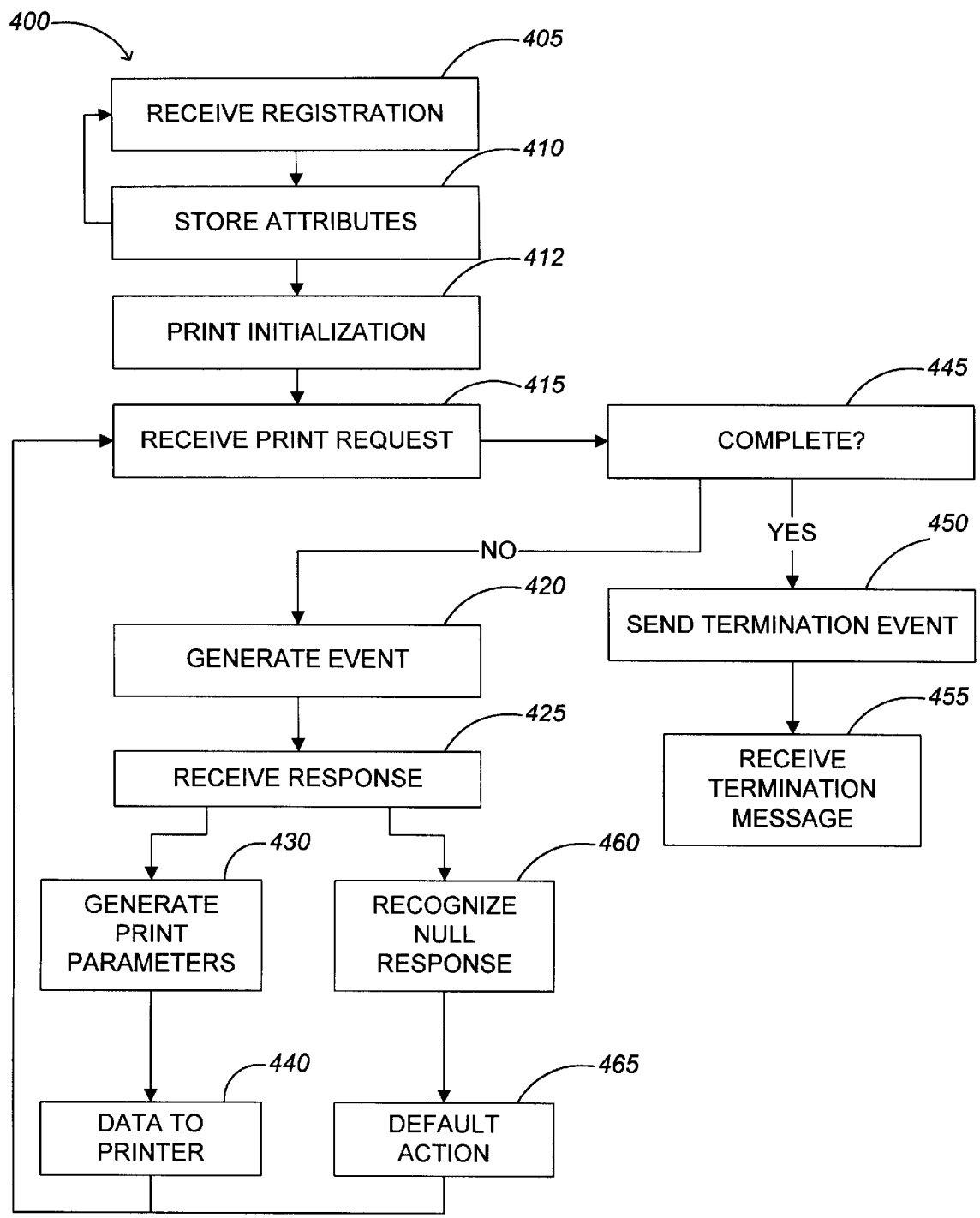

EVENT-BASED PRINTING

BACKGROUND

The invention relates to computer printing systems.

Conventional computer-based printing systems use an operating system provided printing service, or "print manager". A print manager is an abstraction of a printing system implemented as a collection of operating system-provided application programming interfaces ("API") and one or more print drivers. The print manager converts higher level graphics instructions into a language of control commands for use with a target printer. In a conventional printing system, when a user attempts to print a document from an application, the application sends specific serial commands to the operating system for sequentially printing the content of each page in the document according to user defined parameters.

Print services offered by conventional operating systems such as Apple Macintosh OS and Microsoft Windows® 95 require application programs to control the sequence and operation of the printing process. The application controls functions such as: timing of all requests to print document pages, initializing the printing process, sequential drawing of pages, and informing the printing system of the start and end of each page.

When conventional printing systems implement sophisticated printing features, such as tile printing or color separations, the page content from the application is typically buffered either in memory or on disk and multiple passes over the page content is required (i.e., supplying the same data from the application to the printing system multiple times). Buffering and supplying data in multiple passes can be expensive in terms of printing speed, system memory, and disk storage and access requirements.

SUMMARY

The invention provides methods and apparatus implementing a technique for printing to a selected destination in a computer system. In general, in one aspect, the technique includes generating print events to provide a specific print service to a client application, where the print events request information from the client application according to the specific print service; and receiving responses to the print events from the client application, where at least one response includes print data to be printed to a destination.

In another aspect, the invention provides a technique for requesting a specific print service from a client application. The technique includes initializing a print session to print to a destination by sending a print initialization message to a print manager, receiving a print event from the print manager, and responding to the received print event.

In another aspect, the invention provides a technique for providing a specific print service. The technique includes registering a client application with a print manager; registering one or more attributes with the print manager, where at least one attribute indicates a specific print service to be provided by the print manager; initializing a print session, specifying one or more print session parameters; generating a print event according to the print session parameters and the registered attributes, where the print event requests information from the client application according to the specific print service to be provided by the print manager; generating at least one print parameter according to the specific print service to be provided by the print manager; sending the print event to the client application; if the client application supports the print event, responding to the print event by supplying print data to the print manager, where the print manager supplies the print data and each print parameter to a destination; determining whether the print session is complete; sending a termination print event to the client application; and terminating the print session.

Advantages of the invention include one or more of the following. The printing system is able to offer many sophisticated print services independent of print control capabilities of the client application program. Examples of sophisticated print services include drawing a page multiple times, such as for color separation or tile printing; using repeatable master page content; or customizing printed output with unique information on each copy, such as a retailer's brochure targeted to individual customers (i.e., "personalization"). The printing system optimizes the printer's print flow. In addition, the printing system minimizes the burden on the client application, centralizing common sophisticated features in the print manager. This centralization improves programming efficiency and operation for client applications. The print manager also can be adapted to the limitations of the specific computer system and target printer.

BRIEF DESCRIPTION OF THE DRAWINGS

FIG. 1 is a block diagram of an event-based printing system according to the invention.

FIG. 2 is a flowchart of event-based printing from a system perspective.

FIG. 3 is a flowchart of event-based printing from a client application perspective.

FIG. 4 is a flowchart of event-based printing from a print manager perspective.

DETAILED DESCRIPTION

FIG. 1 shows a computer system 100 including a print manager 105. The print manager 105 supplies print commands, such as page description language ("PDL") commands, to a print driver 115. The print driver 115 supplies printer commands to a printer 120. The printer driver 115 is one example of a destination for the output of the print manager 105. In alternative implementations, the print manager supplies print commands to other destinations such as a document formatting component (e.g., Adobe® Acrobat®), a file, a display device, or a client application 125. The print manager 105 also includes appropriate conversion components for the available destinations.

A client application 125 requests print services from the print manager 105, such as tile printing and color separations. Examples of print services are described below. The client application includes a print component 135. The print component 135 is an abstraction of a section of the client application 125 which is responsible for accessing print services within the client application 125. The print component 135 can be implemented as a separate programming code component or integrated throughout the client application 125. The client application 125 can access the print manager 105 through appropriate print manager routines.

Before a print session begins, the client application 125 registers with the print manager 105. The registration can occur in a number of ways. The client application 125 can request the print manager supply a user interface 130, such as a dialog box, to receive user selections and input indicating desired print services. The client application 125 can provide a user interface 130 directly. The registration can also be performed automatically, such as through a script.

The registration indicates to the print manager 105 that the sending client application 125 operates according to event-based printing and may subsequently request print services from the print manager 105. The registration can include "attributes" which indicate particular print services which the client application 125 may request, such as tile printing or color separations. The registration can also include a selection of a destination for the output of the print manager, such as the print driver 115. In one implementation, compatibility with conventional application programs which do not make use of event-based printing is maintained by allowing these application programs to access print services in a conventional manner. The use of registration distinguishes conventional application programs and client applications 125 to the print manager 105.

The print manager 105 uses attribute lists 127 to control printing. In response to the registration, the print manager creates an attribute list 127 and associates the attribute list 127 with the client application 125. The print manager 105 stores the attributes registered by a client application 125 in the attribute list 127. The client application 125 can register additional attributes by sending additional registrations to the print manager 105, which are added to the attribute list 127. To disable attributes which the client application 125 has previously registered, the client application 125 can send additional registration messages to the print manager 105 indicating which attributes should be removed from the attribute list 127. The print manager 105 uses the attribute list 127 to generate events appropriate for a print session, as described below. The print manager 105 can also provide print services by default or query the client application 125 during a print session whether a print service is appropriate, such as with master pages, as described below.

The print manager 105 can maintain attribute lists 127 for multiple client applications 125. Alternatively, the client application 125 can maintain the attribute list 127 using print manager routines to access the data in the attribute list 127. Similarly, multiple attribute lists 127 can be maintained for the same client application 125 requiring the client application 125 to indicate which attribute list 127 to use when initializing printing.

When the client application 125 is ready to print, the client application 125 sends a print initialization message to the print manager 105. The print initialization message can include print session parameters to control the print session, such as the number of pages to print or the destination. If the print initialization message sent by the client application did not indicate necessary parameters of the print session, such as the number of pages to be printed, the print manager can request print session parameters using a print event record, as described below. The client application can respond to such a request by calling appropriate print manager routines.

After sending the print initialization message, the client application 125 is ready to receive print events from the print manager 105. The client application 125 can receive print events in various ways. Execution control within the client application 125 can pass to a print loop 140. While in the print loop 140, the client application 125 requests, waits for, and responds to print events generated by the print manager 105. The client application 125 can retrieve print event records from a print event queue. The printing process can also be interrupt-driven.

After receiving the print initialization message from the client application 125, the print manager 105 evaluates the attribute list 127 corresponding to the client application 125. The print manager 105 also evaluates other parameters stored within the print manager 105, such as print session parameters, the selected or a default destination, default content or pages provided by the print manager 105 or the target printer 130 (e.g., watermarks). The print manager 105 also accesses appropriate print service components 145, described below, to evaluate information necessary to complete the requested print job. The print manager 105 generates print event records representing print events and sends these print event records to the client application 125.

The print manager 105 supports a set of print events. The print events represent requests from the print manager.105 to the client application 125 to facilitate the printing process. Such requests include requests for page content to be printed or queries as to whether a service is supported by the client application 125. The client application 125 can ignore some print events. Thus, the client application 125 can be designed to take advantage of the minimum printing capabilities of the print manager 105 or as many features as are desired for the application.

Examples of print events include a draw page event, a begin page event, a master page event, and a termination event. A draw page event requests that the client application 125 draw a page. A begin page event indicates to the client application that the print manager 105 is ready to print a page and requests that the client application 125 perform any necessary processing before receiving a draw page event. For example, when the print manager 105 is providing color separations, as described below, the client application 125 can optimize the production of separations by supplying the print manager 105 with information indicating what inks are used for each page. This optimization can avoid printing blank separations for pages that do not use all the inks specified for the entire print session. A master page event requests that the client application supply master page content to the print manager 105. A termination event indicates that a print session is complete.

The print manager 105 and client application 125 use print event records to represent print events to communicate about the printing process. The print event records include data organized in a pre-defined format, such as a data structure or object. The print event record includes information which the client application 125 uses to determine the type of the print event represented by the print event record and to respond to the print event record. The print event record can also include information which the client application 125 can use to optimize the client application's 125 response. For example, the optimization information can indicate to the client application 125 a particular region of interest of the document to be printed to which the client application 125 can limit its response. The client application 125 can ignore optimization information. In one implementation, the client application 125 indicates to the print manager 105 whether or not the client application 125 used the optimization information.

The print manager 105 generates a print event record corresponding to a print event and sends the print event record to the client application 125. The available print services, print events and formats of print event records are pre-defined so that the print components 135 of client applications 125 are implemented to provide appropriate responses. The print manager 105 controls the printing process through the print events.

The client application 125 responds to a print event record by supplying data from a logical page of a document to be printed or taking some other appropriate action. For print events where the client application 125 does not recognize the type of the print event or determines a response is not necessary, the client application 125 provides a null response. The null response can indicate the client application 125 is taking no action. The print manager 105 can be programmed to characterize a failure to respond as a null response by the client application 125. The print manager 105 and active print service components 145, discussed below, can proceed assuming all requested data was supplied. If the requested print data has not been supplied, then the print service may fail. Where the print manager 105 has requested the client application 125 draw a page and the client application 125 has ignored that request, the print manager 105 can proceed assuming that a blank page is the requested data.

The actual implementation of printing features is in print service components 145 within the print manager 105. This allocation relieves the client application 125 of the burden of implementing and processing print services. In addition, the print manager 105 is better suited to access the specific features of the computer system and the destination than the client application 125. For example, when the destination is a printer 120, printers often have distinct capabilities, such as memory expansion, memory management, and color separation (i.e., printing colors separately), which the client application may not recognize. The print manager 105 centralizes priority control, providing a uniform interface to client applications 125. In one implementation, the client application 125 responds to all recognized print event records by supplying a single logical page to the print manager 105. The print manager 105, in return, provides appropriate modifications, such as clipping paths. However, client applications 125 remain free to implement printing features, including sophisticated print functions and system- or printer-specific functions, as appropriate.

Each print service component 145 implements one or more print services, such as tile printing. The print manager 105 configures print events based on corresponding print service components 145 to be used. In a print session, a group of one or more print service components 145 are "active" (i.e., the print manager 105 accesses these print service components 145 during the print session). Active print service components are determined by the print manager 105 according to attributes in the attribute list 127 registered by the client application 125. Active print service components can also be indicated by default or system settings for print services stored in the print manager 105. In one implementation, the print service components 145 are objects instantiated while active.

The print manager 105 interacts with the active print service components 145 to generate a sequence of appropriate events to send to the client application 125. The active print service components 145 provide information to the print manager 105 indicating what actions or data to request from the client application 125 according to the nature of the corresponding print services. In addition, active print service components 145 can supply optimization information to the print manager 105 to pass on to the client application 125. The active print service components 145 can configure print parameters to control printing, such as by determining a coordinate mapping between the client application's logical page and the destination's physical paper or determining dimensions defining a border to be added to a page. For example, as described below, in a print service component 145 for tile printing, the print service component 145 maps the coordinates of the supplied print data to fit within a collection of physical pages, or tiles. The active print service components 145 prepare any necessary data structures to receive print data from the client application 125. The client application 125 accesses and modifies these data structures through print manager routines in response to the print event record. The active print service components 145 can also in turn access or modify print data supplied by the client application 125. Thus, the active print service components 145 provide the print manager 105 with the data and information needed to provide the desired print services, through an appropriate combination of requests for information, optimization information, and print parameters.

The print manager 105 supplies the print data and print parameters from the active print service components 145 to the selected destination, such as the print driver 115. The print driver 115 in turn converts the data to printer commands and sends those commands on to the printer 120. In one implementation, the print manager 105 receives the print data and parameters from the active print service components 145, and generates appropriate PDL commands to send to the destination.

When the print manager 105 determines that the current print job is complete, the print manager 105 sends a print event record to the client application 125 indicating that the print job can be terminated. In one implementation, print session parameters supplied by the client application 125 indicate when a print session is complete. In response, the client application 125 sends a print termination message to the print manager 105 confirming the end of the current job and terminating the print session. The print manager 105 and client application 125 can then perform any appropriate cleanup of internal data structures from the print session.

In summary, in one implementation, after the client application 125 initiates printing, the print manager 105 consults the client attribute list 127 to determine the requested features of the print job, represented by registered attributes. Based on these requests, the print manager 105 instantiates one or more print service components 145 for the duration of the print session, as active print service components 145. The print manager 105 communicates information from the client attribute list 127 and the progress through the print session, including the next scheduled print event, as necessary. Each print service component 145 performs appropriate functions, based on the current state and in some cases, the pending print event. For example, a print service component 145 may perform a different function prior to the issuance of a first print event to the client than before subsequent events, or the print service component 145 may perform a different function between each event. The print manager 105 sequences notification of each print service component 145 between events to facilitate the operation of the print service components 145. When the print manager 105 determines that a print session is finished (i.e., the termination event is to be sent to the client application 125), the print manager notifies each print service component 145 so that the print service components 145 may take appropriate actions, such as freeing memory.

FIG. 2 shows a process 200 providing event-based printing. Event-based printing occurs as an interaction between a client application and a print manager. The client application can register with the print manager (step 205). The print manager creates and maintains an attribute list for each registered client application indicating the attributes currently registered for that client application (step 207).

To initiate a print session, the client application sends a print initialization message to the print manager (step 210).

After sending the print initialization message, the client application can request a print event (step 212). In response to the request, the print manager checks whether the print session is complete or not, as described below (step 237). If the print session is not complete, the print manager generates a print event, and transfers the print event to the client application (step 215).

When the client application receives a print event record from the print manager, the client application evaluates the print event type from the print event record (step 220). The client application can respond to recognized print events (step 225) by sending print data to the print manager or taking some internal action as appropriate to the type of the print event. After responding, the client application requests another print event (step 212). The print manager receives the print data from the client application and supplies that print data to any appropriate active print service components within the print manager to provide the appropriate print service for the data. The print service component configures print parameters appropriate to that print service component function (step 230). The print service component can alternatively configure the print parameters before the print manager sends the print event record to the client application. The print service component supplies the print data and the print parameters to the printer through a print driver (step 235). The print manager then waits to receive a next request for a print event from the client application (step 212). The receipt of a request for a print event from the client application can indicate to the print manager that the client application has completed any actions taken in response to the previous print event.

The client application can "ignore" unrecognized print events or print events not requiring a response, and can provide a null response (step 245). The client application continues to request print events until the print session is terminated (step 212). Upon receiving a null response from the client application, the print manager can execute a default response defined within the print manager (step 250). The print manager then waits to receive a next request for a print event from the client application (step 212).

After receiving a request for a print event, the print manager evaluates whether the print session is complete (step 237). When the print manager recognizes that the print session has been completed, such as by printing the final page according to the print session parameters, the print manager generates a print event record for a termination event (step 255). Upon recognizing the termination event, the client application terminates the print session by sending a print termination message to the print manager confirming the conclusion of the print session (step 260).

In an alternative implementation, the print manager does not wait for a request for a print event from the client application, but instead sends print events to the client application as the records are generated. The client application in turn retrieves the print event records from a queue and responds appropriately as described above. Similarly, in another implementation, the print manager does not always wait for a response from the client application before sending the next print event record.

FIG. 3 shows a process 300 of event-based printing from a client application perspective. Initially, the client application indicates to the print manager that print services may be requested by registering with the print manager (step 305). To initiate a print session with the print manager, the client application sends a print initialization message to the print manager (step 310). After sending the print initialization message, the client application enters a print event loop in a client application and requests a print event from the print manager (step 315). When the client application receives a print event from the print manager (step 320), the client application evaluates the type of the print event (step 325). Depending on the print event type, the client application responds such as by sending print data to the print manager (step 330). The print event received from the print manager can include optimization information that the client application can use to optimize its response. The client application can ignore this optimization information. The client application may also respond to the print event by taking some internal action and optionally sending a confirmation to the print manager. After responding to the print event, the client application requests another print event record from the print manager (step 315).

When the print event is of an unrecognizable type or a type that does not require any action, the client application takes no action, and can provide a null response (step 335). The null response indicates that the client application is unable to respond or has determined not to respond to the print event at this time. The ability to ignore unrecognized print events allows for backward compatibility as well as extensibility of the print manager. New print events can be introduced into the print manager which older client applications may not recognize. However, such older client applications can operate with the print manager using null responses indicating to the print manager that the client application cannot handle the type of the print event.

When the client application receives a termination event, the client application responds by sending a print termination message to the print manager (step 340). After sending the print termination message, the client application exits the print event loop and the client application proceeds with non-printing operation.

In an implementation where the client application does not request print events from the print manager, the client application repeatedly receives print events and responds to those print events until receiving a termination print event record. Hence, steps 315, 320, 330, and 335 can be collapsed into a single step.

FIG. 4 shows a process 400 of providing event-based printing from a print manager perspective. The print manager receives a registration from a client application (step 405). The print manager creates an attribute list for that client application storing any attributes supplied with the registration (step 410). The print manager can continue to receive registrations of attributes (step 405) which are stored in the attribute list (step 410) until receiving a print initialization message from the client application (step 412).

After receiving the print initialization message, the print manager waits to receive a request for a print event from the client application (step 415). In response to the request, the print manager checks whether the print session is complete or not, as described below (step 445). If the print session is not complete, the print manager generates a print event record in accordance with the stored attributes for that client application, print session parameters, and appropriate print parameters from active print service components (step 420). The print manager uses the print event records to request information from the client application in the client application. The print manager can use the print event records to determine the support of print services by the client application. For example, as described below, in the case of master pages, the print manager can request a master page from the client application, though the client application had not registered for the master page print service. In addition, the print manager can include optimization information in the print event record. As noted above, the client application responds by supplying data to the print manager through print manager routines (step 425). By accessing these routines, the client application may cause the print manager or appropriate print service components to take some actions. Active print service components generate print parameters to format the print data supplied by the client application, as appropriate (step 430). The print service component sends the data and print parameters to the destination, such as to the printer through the corresponding driver (step 440).

When the client application has completed its response, if any, the client application requests another print event from the print manager. The print manager waits until receiving another request for a print event from the client application (step 415).

After receiving a request for a print event, the print manager evaluates the state of the print session to determine whether the print session has completed (step 445). If the print session has not completed, the print manager generates another print event requesting information from the client application (step 420). If the print manager determines that the print session has completed, the print manager generates a termination event and sends that print event record to the client application (step 450). The print manager then waits until the print manager receives a termination message from the client application confirming the termination of the print session (step 455).

A null response indicates that the client application is not responding to the print event, either because the client application is unable or unwilling to respond (step 460). The print manager can proceed without checking for a null response, assuming the client application has responded appropriately, as described above. In one implementation, the print manager can check for a null response and take a default action in response to receipt of the null response (step 465). The default action can be no action or an action according to a default system setting of the print manager. Thereafter, the print manager waits for another request for a print event (step 415).

Several examples of print services provided by a system according to the invention are described below. The print manager implements these services centrally. Accordingly the burden of implementation is removed from application programmers and placed within the design of the print manager.

One example of a print service which can be provided by a print service component is tile printing. In tile printing, a graphic object that is larger than the physical size of the target paper is printed by printing sections ("tiles") of the object on multiple pieces of paper. A user then reconstructs the object by aligning the individual tile pages. Thus, while in the client application the object may occupy only a single logical page, when the target paper is smaller in physical size than the single logical page requires, the use of tile printing provides a process for producing a coherent physical representation of the graphical object.

In accessing tile printing in a printing system according to the present invention, a client application registers with the print manager indicating appropriate attributes for tile printing. The print service component of the print manager performs the calculations for transforming the single logical page of the client application to multiple tiles for printing. The client application need only supply the logical page and need not perform any tile calculations, such as determining the number or arrangement of tiles. The print service component generates appropriate print parameters such as PDL constructs to map the supplied logical page coordinates into the constructed tiles coordinates. The print service component can also inform the print manager of regions of interest, such as rectangles in the logical page, to be supplied to the client application as optimization information in the print event records. As noted above, the client application can ignore this optimization information. The determination of this optimization information is performed within the print service component. The client application merely follows instructions as received through the print event records. Thus the implementation and control of the tile printing print service is within the print manager, not the client application. The print manager supplies the print data from the client application and the print parameters from the tile printing print service component to the printer through the driver.

Another print service which can be provided by the print manager is color separations. Generally, color separations involve printing each color shown in a graphical object in separate layers, possibly requiring multiple iterations of printing for a single graphical object. The print manager typically produces separations by requesting the client application draw each page multiple times. The print manager can optimize the printing process by informing the client application of the current separation through optimization information supplied in the print event record. The client application can use this optimization information to minimize the data drawn for page content which is disproportionately large, such as color sampled images.

The print manager can also provide a master page print service. In one implementation, the print manager always asks for master pages. Master pages define content that is to be applied to all pages in a document, such as a common header or watermark. Conventional printing systems do not make a distinction between master page content and ordinary page content, so conventional application programs reproduce the master page content for every page of the document. An advantageous implementation of the print manager provides for drawing the master page content once by the client application and storing that content in the print manager. The print manager accomplishes this by sending a print event to the client application requesting the master page content to be drawn separately from the page content of each page in the document. The print manager can use this separate information to optimize performance in printing environments that support mechanisms for representing recurring page content, such as PostScript® Level 2 and newer devices.

A section of pseudo-code describing the operation of one implementation of the printing system is shown below in Table 1. This code illustrates an exemplary flow of operations and relationships between elements in the printing system. The "Print preparation" section corresponds to the registration of attributes described above. The "Printing" section corresponds to the initialization, print events, and responses described above. The "Cleanup" section corresponds to the termination of printing described above.

TABLE 1

```
Key:
    CLIENT_LIST - an encapsulation of all attributes associated with a
client application's print job
    PrintMgr_... - Print system APIs
Print preparation:
    If (document has retained previously created CLIENT_LIST)
        {
        Restore:
        CLIENT_LIST = PrintMgr_ClientListRestore( )
        }
    else
        {
        Build default:
        CLIENT_LIST = PrintMgr_ClientListCreate( )
        }
    Set document-specific attributes using PrintMgr_ClientListSet( ),
some of which may be dependent on data provided from the print man-
ager
by PrintMgr_ClientListGet( )
    E.g.:
    if (PrintMgr_ClientListGet( ) == color_separating)
        {
        for (i = 0; i < client_ink_count; ++i)
            {
            Build ink_record
            PrintMgr_ClientListSet(ink_record)
            }
```

TABLE 1-continued

```
        }
Printing:
    PrintMgr_InitPrinting(CLIENT_LIST)
    while ((event = PrintMgr_GetNextPrintEvent) != END_PRINTING)
        {
        Respond to events:
            E.g. draw_pages(event)
        Print manager controls all logic required to print between events
        }
    PrintMgr_EndPrinting( )
Cleanup:
    if (client wants to retain current print attributes)
        {
        Save to client document:
        PrintMgr_ClientListSave(CLIENT_LIST)
        }
PrintMgr_ClientListDestroy(CLIENT_LIST)
```

An example of a header file indicating available print manager routines is shown in Table 2. Client applications can use these routines to respond to print events and to access data within the print manager directly.

TABLE 2

```
/*
 * Adobe Graphics Manager Printing
 *
 * Copyright © 1995–1998 Adobe Systems Inc.
 * All Rights Reserved
 *
 * AGMPrint.h
 */
#ifndef _H_AGMPrint
#define _H_AGMPrint
#include "AGMCnfig.h"
#include "AGMTypes.h"
#ifdef WIN_ENV
#ifdef AGM_STRICT
    #ifdef _OS2_
    #include <os2.h>
    typedef void * PlatformDEVMODE;
    #else
    #include <Windows.h>
    typedef DEVMODE* PlatformDEVMODE;
    #endif
#else
typedef void* PlatformDEVMODE;
#endif
#endif
#ifdef MAC_ENV
#ifdef AGM_STRICT
#include <Printing.h>
typedef THPrint PlatformTHPrint;
#else
typedef void* PlatformTHPrint;
#endif
#endif
#include "AGMColor.h"
#include "AGMClrSp.h"
#include "AGMemObj.h"
#ifdef _cplusplus
extern "C" {
#endif
/* The Metrowerks 68k Mac compiler expects functions to return
    pointers in A0 instead of D0. This pragma tells it they are in D0.
*/
#if defined(MAC_ENV) && defined(_MWERKS_) && !defined(powerc)
#pragma pointers_in_D0
#endif
/* ----------------------API Pseudocode------------------------ */
```

TABLE 2-continued

```
/*
    Here is pseudocode for the expected sequence of API calls:
    If(document has retained previously created client items)
        {
        Create local AGM stream object via _t_AGMStream type
        Call AGMPrintClientItemsRestore (w/ stream object) to pump up
AGMPrintClientItems
        }
    else
        {
        Call AGMPrintClientItemsCreate to build a default AGMPrintClientItems
        }
    Call AGMPrintClientItemsSet to set document-specific attributes
    E.g.: if (AGMPrintClientItemsGet == color separating)
        {
        for (i = 0; i < client inks; ++i)
            {
            Build ink struct
            Call AGMPrintClientItemsSet (ink struct)
            }
        }
    if(client wants page setup UI services)
    Call AGMPrintPageSetupUI w/ AGMPrintClientItems
    Call AGMInitPrinting w/ AGMPrintClientItems
    while (Call AGMGetNextPrintEvent != END_PRINTING)
    Print via responding to events (e.g. drawing pages)
    Call AGMEndPrinting
    if(client wants to retain current print attributes)
        {
        Create local AGM stream object via _t_AGMStream type
        Call AGMPrintClientItemsSave (w/ stream object) to write AGMPrintClientItems
to client file
        }
    Call AGMPrintClientItemsDestroy
*/
#define AGMPrintAPIVersion 1
/* error codes */
typedef uint32 AGMPrintError;
enum {
    kAGMPrtErrSuccess,
    kAGMPrtErrSavingClntItms,
    kAGMPrtErrRestoringClntItms,
    kAGMPrtErrInvalidClntItm,        /* bad data given to client items set request */
    kAGMPrtErrUnsprtdClntItm,        /* client items object doesn't support a get/set
request */
    kAGMPrtErrNoSuchClntItm,         /* client items object can't support a get request due
to missing
    kAGMPrtErrOutOfRangeClntItm,     /* bad client items data because it's out of expected
range
    kAGMPrtErrUnsprtdPrtObjItm,      /* print object doesn't support a get/set request */
    kAGMPrtErrUnsprtdPrtObjItmState, /* print object state is invalid for a get/set
request */
    kAGMPrtErrInit,
    kAGMPrtErrNoMem,
    kAGMPrtErrUIInit,
    kAGMPrtErrUserAbort,
    kAGMPrtErrEvtOrder,
    kAGMPrtErrConfig,
    kAGMPrtErrType,
    kAGMPrtErrInvldArg,
    kAGMPrtErrStream,
    kAGMPrtErrUnsprtdDeviceType,
    kAGMPrtErrInvldEntrance,
    kAGMPrtErrclntItmSzChng,         /* client item struct has changed size */
    kAGMPrtErrDependentClntItm,      /* invalid client item data due to dependency on
other client
    kAGMPrtErrOther
};
/* ---------------------- client item data and APIs ----------------- */
/* client item ids (for use with AGMPrintClientItemsGet/Set) */
typedef uint32 AGMPrintClientItemsID;
enum {
    kAGMPrtClntItmsInk,
    kAGMPrtClntItmsInkUnused,
    kAGMPrtClntItmsExportFormat,
    kAGMPrtClntItmsPSExportOpts,
    kAGMPrtClntItmsPSDefClrSpace,
    kAGMPrtClntItmsBMSmplg,
    kAGMPrtClntItmsDocInfo,
```

TABLE 2-continued

```
    kAGMPrtClntItmsPgSect,
    kAGMPrtClntItmsBleed,
    kAGMPrtClntItmsXparency,
    kAGMPrtClntItmsPgRange,
    kAGMPrtClntItmsPgRangeUICoOp,
    kAGMPrtClntItmsPgNumOrdinalMode,
    kAGMPrtClntItmsUseDIC,
    kAGMPrtClntItmsEmitCRDs,
    kAGMPrtClntItmsColorState,
    kAGMPrtClntItmsPlatformPrintRec,
    kAGMPrtClntItmsScalg,
    kAGMPrtClntItmsCtrImgArea,
    kAGMPrtClntItmsUICoOpNotify,
    kAGMPrtClntItmsReverseOrder,
    kAGMPrtClntItmsPageMarks,
    kAGMPrtClntItmsEvenOdd,
    kAGMPrtClntItmsMeasSystem,
    kAGMPrtClntItmsTiling,
    kAGMPrtClntItmsImgReplace,
    kAGMPrtClntItmsProof,
    kAGMPrtClntItmsTrapStyle,
    kAGMPrtClntItmsTrapZone,
    kAGMPrtClntItmsPSHalftoningOpts,
    kAGMPrtClntItmsPSOptScreens,
    kAGMPrtClntItmsFontDownloadOpts,
    kAGMPrtClntItmsPagesMode,
    kAGMPrtClntItmsPrinterChgd,
    kAGMPrtClntItmsPSInRIPSepsOK,
    kAGMPrtClntItmsPSInRIPTrappingOK,
    kAGMPrtClntItmsTrapping,
    kAGMPrtClntItmsPrinterSpcfcData,
    kAGMPrtClntItmsRdrSpread,
    kAGMPrtClntItmsRdrSpreadStatus,
    kAGMPrtClntItmsOrientation,
    kAGMPrtClntItmsPSGradientOpts
};
#define PS_FILE_NAME_MAX 32        /* max #of chars in a PS file name */
#define PS_LINE_LENGTH_MAX 255     /* max number ofchars in a line (red book
p.628) */
/* document information (kAGMPrtClntItmsDocInfo) */
typedef struct _t_DocumentInfo {
    char name[ PS_FILE_NAME_MAX ];       /* document name */
    char creator[ PS_LINE_LENGTH_MAX ];  /* generates PS "%%Creator:" DSC
comment */
    char forUser[ PS_LINE_LENGTH_MAX ];  /* generates PS "%%For:" DSC
comment*/
    char creationDate[ PS_LINE_LENGTH_MAX ]; /* generates PS "%%Creation
Date:" DSC comment - */
} AGMPrintDocumentInfo;
/* bitmap sampling options (kAGMPrtClntItmsBMSmplg) */
typedef uint32 AGMPrintBitmapSampling;
enum {
    kAGMPrintBMSampleOmit,
    kAGMPrintBMSampleNormal,
    kAGMPrintBMSampleLowRes,
    kAGMPrintBMSampleOptimized,
    kAGMPrinttBMSampleInvld
};
/* print both pages, even only, or odd only (kAGMPrtClntItmsEvenOdd) */
typedef uint32 AGMPrintEvenOddPages;
enum {
    kAGMPrintBothPages = 0,
    kAGMPrintEvenPagesOnly,
    kAGMPrintOddPagesOnly,
    kAGMPrintEvenOddInvalid
};
/* AGM measurement systems (kAGMPrtClntItmsMeasSystem) */
typedef uint32 AGMPrintMeasSystem;
enum {
    kAGMPrintMeasPoints = 0, /* points, e.g., "12.5 pt" - points is default measurement
system
    kAGMPrintMeasInches, /* inches, e.g., "2.4 in" - same as InchesDecimal in K2 (they
only
    kAGMPrintMeasCM, /* centimeters, e.g., "2.4 cm" */
    kAGMPrintMeasMM, /* millimeters, e.g., "2.4 mm" */
    kAGMPrintMeasPicas, /* Picas, e.g., "4p9" */
    kAGMPrintMeasCiceros, /* Ciceros, e.g., "25c4" */
    kAGMPrintMeasCJK, /* Chinese/Japanese/Korean, e.g., "23.2 ha" */
    kAGMPrintMeasInvalid
```

TABLE 2-continued

```
};
/* AGMPrintOrientation - landscape, portrait, etc. (kAGMPrtClntItmsOrientation) */
typedef uint32 AGMPrintOrientation;
enum {
    kAGMPrintOrientationPortrait = 0,
    kAGMPrintOrientationLandscape,
    kAGMPrintOrientationInvalid
};
/* asymmetric scaling (kAGMPrtClntItmsScalg) */
#define AGMPrintMinScaleFactor 1.0
#define AGMPrintMaxScaleFactor 1000.0
typedef struct __t__AGMPrintScaling {
    AGMFloatPoint scaleFactors; /* X and Y scale factors, with range expressed by
above */
    Bool32 scaleFactorLinked; /* are X and Y scale factors linked to each other? */
    Bool32 scaleToFit; /* should we scale the logical page to fit the paper's */
} AGMPrintScaling;
/* Print single logical client page on multiple pieces of paper when the page is larger than
the paper. (kAGMPrtClntItmsTiling)
*/
#define AGMPrintMinTiling 0.0 /* 0.0 inches, = 0 points */
#define AGMPrintDfltMinTiling 18.0 /* 0.25 inches, = 18 points */
#define AGMPrintDfltMaxTiling 306.0 /* 4.25 inches, = 306 points - default max */
/* tiling modes */
typedef uint32 AGMPrintTilingMode;
enum {
    kAGMPrintTilingNone = 0, /* None */
    kAGMPrintTilingAuto, /* Auto - use target paper rect and client page rect to
determine #tiles */
kAGMPrintTilingManual, /* Manual - client draws page once based on client's upper
left origin */
    kAGMPrintTilingInvalid
};
typedef struct __t__AGMPrintTiling {
    AGMPrintTilingMode mode;
    float overlap; /* overlap - kAGMPrintTilingAuto mode only */
    AGMFloatPoint manualOrigin; /* upper-left coordinate of tile */
} AGMPrintTiling;
/* printer's marks. (kAGMPrtClntItmsPageMarks) */
typedef struct __t__AGMPrintPageMarks {/* page mark info for seps */
    Bool32 allMarks; /* should we print all page marks? */
    Bool32 crops; /* should we print crop marks? */
    Bool32 bleeds; /* should we print bleed marks? */
    Bool32 pageInfo; /* should we print general page info? */
    Bool32 registration; /* should we print registration info? */
    Bool32 colorBars; /* should we print color bars? */
    char marksName[PS__FILE__NAME__MAX ];/* type marks PostScript file name */
} AGMPrintPageMarks;
/* limits for kAGMPrtClntItmsBleed */
#define AGMPrintMinBleed 0.0
#define AGMPrintMaxBleed 72.0 /* 72 points */
/* export format (kAGMPrtClntItmsExportFormat) */
typedef int32 AGMPrintExportFormat;
enum {
    kAGMPrintExportPS, /* PS - no device-dependencies */
    kAGMPrintExportEPS, /* EPS - no device-dependencies */
    kAGMPrintExportTargetPrtr, /* export whatever the stream is for the target printer */
    kAGMPrintExportInvld
};
/* PS level (for use with AGMPrintPSExportOptions) */
typedef uint32 AGMPrintPSLevel;
enum {
    kAGMPrintPSLevelAll,
    kAGMPrintPSLevel2,
    kAGMPrintPSLevel2WithDEFG,
    kAGMPrintPSLevel3,
    kAGMPrintPSLevelInvId
};
/* options when exporting PS (kAGMPrtClntItmsPSExportOpts) */
typedef struct __t__AGMPrintPSExportOptions {
    Bool32 binaryData; /* use binary data vs. ASCII hex? (e.g. for image samples) */
    AGMPrintPSLevel PSLevel; /* PS level to target output for - see AGMPrintPSLevel
above */
} AGMPrintPSExportOptions;
/* streams when exporting PS (kAGMPrtObjectItmsPSExportStrms) */
typedef struct __t__AGMPrintPSExportStreams {
    AGMStream *asciiOut; /* include output device dependencies in job? */
    AGMStream *binaryOut; /* produce image samples in binary or ASCII hex? */
} AGMPrintPSExportStreams;
```

TABLE 2-continued

```
/* PS default device color space (kAGMPrtClntItmsPSDefClrSpace)
Note: When printing direct (vs. exporting), default AGMPrintPSDefColorSpace is
the space specified by the current PPD. Clients may override this for other other
behaviors.
*/
typedef uint32 AGMPrintPSDefColorSpace;
enum {
    kAGMPrintPSColorSpaceGray,
    kAGMPrintPSColorSpaceRGB,
    kAGMPrintPSColorSpaceCMYK,
    kAGMPrintPSColorSpaceInvld
};
/* font download options (kAGMPrtClntItmsFontDownloadOpts) */
typedef uint32 AGMPrintFontDownloadOpts;
enum {
    kAGMPrtFontDownloadIncremental = 0, /* Download only glyphs used, this is an
incremenal update */
    kAGMPrtFontDownloadWholecloth, /* Download whole font */
    kAGMPrtFontDownloadNone, /* Do not download any font data */
    kAGMPrtFontDownloadInvld /* Invalid option */
};
/* limits for ink data */
#define AGMPrintMinFreq 1 /* 1 lpi */
#define AGMPrintMaxFreq 500 /* 500 lpi */
#define AGMPrintMinAngle 0 /* 0 degrees */
#define AGMPrintMaxAngle 360 /* 360 degrees */
#define AGMPrintMinOPThold 0 /* 0 percent ink coverage */
#define AGMPrintMaxOPThold 100 /* 100 percent ink coverage */
#define PS_INK_NAME_MAX 32 /* max #of chars in an ink name */
#define PS_INK_SPOT_FUNC_MAX 1024 /* max #of chars in an ink spot function */
/* halftoning options (kAGMPrtClntItmsPSHalftoningOpts) */
typedef uint32 AGMPrintPSCompHalftoneScrn;
enum {
    kAGMPrtPSCompHtScrnDef = 0, /* default screen */
    kAGMPrtPSCompHtScrnCustomImage,/* screen optimized for images and continous
tone */
    kAGMPrtPSCompHtScrnCustom, /* custom screen */
    kAGMPrtPSCompHtScrnInvld
};
typedef struct _t_AGMPrintPSHalftoningOpts {
    float compFreq; /* screen frequency for composites */
    float compAngle; /* screen angle for composites */
    AGMPrintPSCompHalftoneScrn compScrnType; /* screen type */
    int32 optScrnsIndx; /* current index into AGMPrintPSOptScreens */
} AGMPrintPSHalftoningOpts;
#define PS_MAX_OPTSCREEN_LEN 64 /* max optimized screen string length */
#define PS_MAX_OPT_SCREENS 100 /* max #of optimized screen sets */
#define PS_INKS_PER_OPT_SCREEN_SET 5 /* #of inks in an optimized screen set */
/* ink types */
typedef uint32 AGMPrintInkType;
enum {
    kAGMPrtInkCyan = 0,
    kAGMPrtInkMagenta,
    kAGMPrtInkYellow,
    kAGMPrtInkBlack,
    kAGMPrtInkOtherProcess,
    kAGMPrtInkSpot,
    kAGMPrtInkInvld
};
/* Optimized screening (ink-specific freqs. and angles organized by freq/res from current
PPD
used by UI to display user optimal screening choices.
*/
typedef struct _t_AGMPrintPSOptScreenInks {
    AGMPrintInkType type; /* C/M/Y/K/other */
    float freq; /* frequency, this optimized screen */
    float angle; /* angle, this optimized screen */
} AGMPrintPSOptScreenInks;
typedef char AGMPrintPSOptScreenLbl[PS_MAX_OPTSCREEN_LEN];
typedef struct _t_AGMPrintPSOptScreenData {
    AGMPrintPSOptScreenLbl label; /* user name of optimized screen */
    AGMPrintPSOptScreenInks inks[PS_INKS_PER_OPT_SCREEN_SET]; /* 1 struct
each for C/M/Y/K/Custom */
} AGMPrintPSOptScreenData;
/* AGMPrintOptScreens stores freq/angle per C/M/Y/K/Custom inks for a specified
optimized screening
Required by UI to display freq/angle when optimized screen other than default is
selected.
(kAGMPrtClntItmsPSOptScreens)
```

TABLE 2-continued

```
*/
typedef struct _t_AGMPrintPSOptScreens {
    int32 count; /* number of opt screen sets */
    AGMPrintPSOptScreenData optScrns[PS_MAX_OPT_SCREENS]; /* optimized
screening sets from PPD */
} AGMPrintPSOptScreens;
/* gradient printing options */
typedef struct _t_AGMPrintPSGradientOpts {
    Bool32 forceContone; /* force continuous tone output on rogue color printers */
    Bool32 level1Compat; /* level 1 compatible gradients rendered w/o image operator */
} AGMPrintPSGradientOpts;
/* RGB representation of an ink (for UI purposes) */
typedef struct _t_AGMPrintRGBColor
{
    float red; /* range: 0-1 for each component */
    float green;
    float blue;
} AGMPrintRGBColor;
/* ink trapping type */
typedef uint32 AGMPrintInkTrapType;
enum {
    kAGMPrintTrapInkNormal = 0, /* Normal - tradition process inks and most spot
inks */
    kAGMPrintTrapInkTransp, /* Transparent - for varnishes and die line inks */
    kAGMPrintTrapInkOpaque, /* Opaque - for heavy, non-transparent inks, e.g.,
metallic inks
    kAGMPrintTrapInkOpaqueIgnore, /* Opaque Ignore - for inks that have undesirable
interactions with other inks, usually heavy non-transp*/
    kAGMPrintTrapTypeInvalid
};
/* Inks (kAGMPrtClntItmsInk & kAGMPrtClntItmsInkUnused)
Notes: Client registers inks with AGMPrintClientItemsID of kAGMPrtClntItmsInk.
It only has to do this once per job, before AGMInitPrinting. If the ink list
needs to be reset to no inks in preparation for registering new inks (e.g. after
restoring a saved client items object), the client can pass a 1 as the value of
"data" when calling AGMPrintClientItemsSet. Default when separating is to assume
all inks are used on all pages. If client doesn't want this behavior, it must
explicitly mark inks as unused on each page with AGMPrintClientItemsID of
kAGMPrtClntItmsInkUnused.
Also, client must register the process inks in all cases, in order to support
the convert spot inks to process feature and to provide localized ink names.
If these inks aren't actually used, client must explicitly mark them as unused (see above).
Internally, the 4 process inks are always constructed. To make the specification
process easier, clients can fetch the default values of the process inks (which are
guaranteed to be indexes 0-3), then add the name at minimum, then turn around and set
the ink. When process inks are fetched that aren't marked internally as registered yet,
the error kAGMPrtErrNoSuchClntItm is returned. Clients should recognize this error as
acceptable in this situation and continue the registration process.
*/
typedef struct _t_AGMPrintInk {
    char name[PS_INK_NAME_MAX ]; /* ink name */
    AGMPrintInkType type; /* type (CMYK, spot, etc.) */
    Bool32 printInk; /* print the ink plate? */
    Bool32 overprintInk; /* overprint the ink plate? */
    float overprintThold; /* overprint threshold percentage for the ink */
    float neutralDensity; /* neutral density; -1 = calc. this from rgb value */
    AGMPrintInkTrapType trapType; /* trapping type: Normal, transp, opaque,
opaqueIgnore */
    int32 trapOrder/ /* trapping order (ordinal); -1 = don't care - use */
    Bool32 overridePPD; /* 1 = don't get freq/angle from PPD */
    float freq; /* Screen frequency */
    float angle; /* Screen angle */
    AGMPrintRGBColor rgb; /* RGB color for UI screen swatch */
} AGMPrintInk;
/* color states (AGMPrintColorState) */
typedef uint32 AGMPrintColorStateType;
enum {
    kAGMPrtCSComposite,
    kAGMPrtCSInRIPSeps,
    kAGMPrtCSOnHostSeps,
    kAGMPrtCSInvld
};
typdef struct _t_AGMPrintColorState {
    AGMPrintColorStateType type; /* composite page or separations? */
    Bool32 spotsToProcess; /* convert spot inks to process when separating? */
} AGMPrintColorState;
#define PAGE_SECTION_STYLE_STR_MAX 32 /* max #of chars in a page section
style string */
/* page printing modes (kAGMPrtClntItmsPagesMode) */
```

TABLE 2-continued

```
typedef uint32 AGMPrintPagesMode;
enum {
    kAGMPrtPagesAll = 0, /* print All pages */
    kAGMPrtPagesRanges, /* print pages based on ranges */
    kAGMPrtPagesBySection, /* print selected sections */
    kAGMPrtPagesInvld
};
#define PAGE_SECTION_NAME_MAX 32 /* max #of chars in a page section name */
/* document's page sections (kAGMPrtClntItmsPgSect) */
typedef struct _t_AGMPrintPageSection {
    char name[PAGE_SECTION_NAME_MAX ]; /* name of section */
    uint32 minPg; /* smallest page number in section */
    uint32 maxPg; /* largest page number in section */
    char minPgStyleStr[PAGE_SECTION_STYLE_STR_MAX]; /* UI label */
    char maxPgStyleStr[PAGE_SECTION_STYLE_STR_MAX]; /* UI label */
    AGMFloatRect pageSize; /* logical page size for section */
    Bool32 bPrint; /* 1 = include in output; 0 = don't include; only applies */
                   /* to kAGMPrtPagesBySection */
    Bool32 bFirstPageIsOdd;/* 1 (true) if 1st page of the section is considered to be odd
                           /* for purposes of even/odd printing, else 0 (false) */
} AGMPrintPageSection;
/* document's page ranges (kAGMPrtClntItmsPgRange)_ */
typedef struct _t_AGMPrintPageRange {
    uint32 startSectIndex; /* section array id for starting page of range */
    uint32 startSectPg; /* starting page number */
    uint32 endSectIndex; /* section array id for ending page of range */
    uint32 endSectPg; /* ending page number */
} AGMPrintPageRange;
/* reader spreads (kAGMPrtClntItmsRdrSpread) */
typedef struct _t_AGMPrintRdrSpread {
    Bool32 isDocDefault; /* true if this is the document default rdr spread, and
    union {
       uint32 pagesPerSpread; /* if isDocDefault, the number of pages per spread */
       AGMPrintPageRange pgRange; /* if !isDocDefault, the page range that defines
this*/
    } u;
} AGMPrintRdrSpread;
#define TRAP_NAME_MAX 32 /* max #of chars in a trapping zone or style name */
#define TRAP_DEF_STYLE_INDEX -1 /* printer's current default trap params vs.
actual user- */
#define AGMPrintMinNDensity 0.001 /* min ink neutral density, trapping */
#define AGMPrintMaxNDensity 10.0 /* max ink neutral density, trapping */
#define AGMPrintMinBlkDensityTH 0.001 /* min black density TH, styles trapping */
#define AGMPrintMaxBlkDensityTH 12.0 /* max black density TH, styles trapping */
#define AGMPrintMinTrapWidth 0.000001 /* min widths in points - default and black,
trapping */
#define AGMPrintMaxTrapWidth 10 /* max widths in points - default and black,
trapping */
#define AGMPrintMinTrapRes 0.0 /* min trapping resolution, styles trapping */
#define AGMPrintMaxTrapRes 20000000000.0 /* max trapping resolution, styles trapping
*/
/* from PM 6.5 in-RIP trapping plugin, subject to change
/* AGM Image trap placment options */
typedef uint32 AGMPrintImgTrapPlacement;
enum {
    kAGMPrintTrapImageCenter = 0, /* Center - straddle edge between objects and
images */
    kAGMPrintTrapImageChoke, /* Choke - objects overlap abutting image */
    kAGMPrintTrapImageNormal, /* Normal - same trapping rules as elsewhere in pub
*/
    kAGMPrintTrapImageSpread, /* Spread - bitmap image overlaps abutting object */
    kAGMPrintTrapImageInvalid
};
/* trapping zones (kAGMPrtClntItmsTrapZone)
AGMPrintTrapZone and AGMPrintDocTrapStyle describe document level In-RIP
trapping parameters
Trapping parameters let the output device compensate for the misregistration
(tiny gaps or color shifts) by creating tiny overlaps (traps) between
colors on a printed page.
Internally, a default zone is always constructed that applies to the entire document, to
support
ease of requesting an entire document to trap with the same specs. However, as with ink
names,
expected that clients will localize the name for this zone. To make the specification
process easier, clients can fetch the default zone (which is always index 0), then add the
name
then turn around and set the zone. However, note that the setting process requires using a
"data"
-1 with AGMPrintClientItemsSet, which distinguishes the setting of values for this
```

TABLE 2-continued special zone
request to reset all user zones in the job (a "data" value of 0).
*/
typedef struct __t_AGMPrintTapeZone
{
    char name[TRAP_NAME_MAX]; /* trap zone name */
    int32 styleIdx; /* index to trapping style; -1 is default; */
    Bool32 enabled; /* trapping enabled? 1 = yes, 0 = no */
    Bool32 uiOrdinalMode; /* display page info in UI in ordinal mode when true
    AGMPrintPagesMode pgMode; /* how this zone applies to doc. pages */
    int32 pgRangeCt; /* number of trap page ranges assoc'd. with this trap */
    AGMPrintPageRange* pgRanges; /* array of page ranges to which this trapping
applies */
} AGMPrintTrapZone;
/* trapping style - a group of trapping attributes with a style name
(kAGMPrtClntItmsTrapStyle) */
typedef struct __t_AGMPrintDocTrapStyle {
    char name[TRAP_NAME_MAX];/* style name */
    Bool32 images2Objs; /* trap images to objects? */
    Bool32 internalImg; /* internal image trapping? */
    float dfltWidth; /* default width */
    float blackWidth; /* black width */
    float colorScaling; /* %color scaling */
    float stepTH; /* %Step threshold */
    float blackColorTH; /* %black color threshold */
    float blackDensityTH; /* black density threshold */
    float slidingTH; /* %sliding trap threshold */
    int32 resolutuion; /* image resolution, dpi */
    AGMPrintImgTrapPlacement imgPlacement; /* image trap placement */
} AGMPrintTrapStyle;
/* printer change event (kAGMPrtClntItmsPrinterChgd) */
define PRTR_NAME_MAX 256
typedef struct __t_AGMPrinterChange
{
    Bool32 bChgd; /* printer changed? 1 = yes, 0 = no */
    char name[PRTR_NAME_MAX]; /* printer name */
    } AGMPrinterChange;
    /* ------------------ Print UI Client Participation API -------------------- */
    /* UICoOp event list (used by AGMPrintUICoOpNotifyProc): */
    typedef enum
    {
      /* Call notify proc just before displaying the button: */
      kAGMPrintUICoOpEventInit,
      /* Call notify proc when the button is hit: */
      kAGMPrintUICoOpEventHit,
      /* Call notify proc just before deleting button's attributes: */
      kAGMPrintUICoOpEventDelete,
      kAGMPrintUICoOpEventCount
    }
    AGMPrintUICoOpEvent;
    /* UICoOp error list (used by AGMPrintUICoOpNotifyProc): */
    typedef uint32 AGMPrintUICoOpNotifyError;
    enum
    {
      kAGMPrintUICoOpNotifyOk, /* All is rosy, proceed with printing. */
      kAGMPrintUICoOpNotifyUserAbort, /* Cancel printing at user's request. */
      kAGMPrintUICoOpNotifyError, /* Error, printing will be aborted. */
      kAGMPrintUICoOpNotifyCount
}
struct __t_AGMPrintUICoOp;
typedef struct __t_AGMPrintUICoOp AGMPrintUICoOp; /*
kAGMPrtClntItmsUICoOpNotify */
/*
* Following routine gets called by AGM when the button is about to be displayed,
* hit or when the AGMPrintUICoOp structure is about to be deleted (clients may need
* to init or delete objects pointed to by clientData).
*
* NOTE1: on button init/hit the callback is made in the context of the printing
* UI, whatever that means for a particular platform (Win, Mac).
*
* NOTE2: Clients within a callback are not allowed to do any AGM printing
* calls--there is a guard that will reject them (return an error).
*/
typedef AGMPrintUICoOpNotifyError (AGMCALLBACK
*AGMPrintUICoOpNotifyProc)(
    AGMPrintUICoOp* data,
    AGMPrintUICoOpEvent event
);
/* Panel ID list (used by AGMPrintUICoOp): */

TABLE 2-continued

```
typedef uint32 AGMPrintUICoOpPanelID;
enum
{
    kAGMPrintUICoOpPanelAdvPageControl, /* Advanced page control */
    kAGMPrintUICoOpPanelScaleAndFit, /* Scale and Fit options */
    kAGMPrintUICoOpPanelPageMarks, /* Page Marks */
    kAGMPrintUICoOpPanelGraphics, /* Graphics (image inclusion) */
    kAGMPrintUICoOpPanelColor, /* Color (ink selection) */
    kAGMPrintUICoOpPanelTrapping, /* Trapping */
    kAGMPrintUICoOpPanelCount,
    kAGMPrintUICoOpPanelInvld
};
#define AGMPrintUICoOpLabelSize 64 /* Max label size for button labels: */
/* kAGMPrtClntItmsUICoOpNotify */
typedef struct _t_AGMPrintUICoOp
{
    /* Specifies which panel/UI grouping to display a button with following label in.
     * panelID must be valid, label non-NULL. */
    AGMPrintUICoOpPanelID panelID;
    char label[AGMPrintUICoOpLabelSize];
    /* When the button is about to be displayed, hit, or this struct is about
     * to be deleted, AGM will call this routine (clients may need to init or
     * delete clientData).
     * notifyProc must be non-NULL. */
    AGMPrintUICoOpNotifyProc notifyProc;
    /* This is an optional storage available to the client.
     * clientData is client-defined, may be NULL. */
    void* clientData;
    /* This is a storage area private to AGM. Clients don't have to worry
     * about it, and they shouldn't write to it.
     * This field is necessary for the notify call decoy to maintain
     * the reentrancy state. */
    void* agmPriv;
}
*AGMPrintUICoOpPtr;
/* -------------- Page Range UI Client Participation API --------------- */
#define AGMPrintPgRangeUICoOpStringSize 128 /* Max string size for UI display: */
/* errors */
typedef uint32 AGMPrintPgRangeUICoOpError;
enum
{
    kAGMPrintPgRangeUICoOpOk, /* All is rosy, proceed with printing. */
    kAGMPrintPgRangeUICoOpInvldString, /* Generic error: range string (user input)
invalid.
    kAGMPrintPgRangeUICoOpError, /* Other error, printing should be aborted. */
    /* The following errors indicate an invalid page range string. */
    kAGMPrintPgRangeUICoOpInvldSectionName, /* String had colon, but no section
name match*/
    kAGMPrintPgRangeUICoOpInvldNumber, /* No number found */
    kAGMPrintPgRangeUICoOpNotJustNumber, /* Number part of string also had other
chars */
    kAGMPrintPgRangeUICoOpErrorCount
};
/* Event list: */
typedef uint32 AGMPrintPgRangeUICoOpEvent;
enum
{
    /* Call proc to build string from the page range list.
     * Return the string (allocated by the caller) to be displayed in UI. */
    kAGMPrintPgRangeUICoOpBuildString,
    /* Call proc to validate user-entered string (from the page sect list).
     * Return number of ranges in the string. */
    kAGMPrintPgRangeUICoOpValidateString,
    /* Call proc to build page range list from the string.
     * Return page range values in the page range list (allocated by the caller). */
    kAGMPrintPgRangeUICoOpBuildRangeList,
    /* Call proc just before deleting AGMPrintPgRangeUICoOp struct. */
    kAGMPrintPgRangeUICoOpDelete,
    kAGMPrintPgRangeUICoOpEventCount
};
typedef struct _t_AGMPrintPgRangeUICoOp AGMPrintPgRangeUICoOp;
typedef AGMPrintPgRangeUICoOpError (AGMCALLBACK
*AGMPrintPgRangeUICoOpProc)(
    AGMPrintPgRangeUICoOp* data,
    char* pgRangeString,
    uint32* noSects,
    AGMPrintPageSection** sectList,
    uint32* noRanges,
    AGMPrintPageRange** rangeList,
```

TABLE 2-continued

```
    Bool8 ordinalState,
    AGMPrintPgRangeUICoOpEvent event );
typedef struct __t__AGMPrintPgRangeUICoOp
{
    /* When a display string is to be constructed, validated, commited,
    * or this struct is about to be deleted, AGM will call this routine
    * (clients may need to init or delete clientData).
    * notifyProc must be non-NULL. */
    AGMPrintPgRangeUICoOpProc notifyProc;
    /* This is an optional storage available to the client.
    * clientData is client-defined, may be NULL. */
    void* clientData;
    /* This is a storage area private to AGM. Clients don't have to worry
    * about it, and they shouldn't write to it.
    * This field is necessary for the notify call decoy to maintain
    * the reentrancy state. */
    void* agmPriv;
}
*AGMPrintPgRangeUICoOpPtr;
#ifdef __cplusplus
/* AGMPrintClientItems is opaque to clients. They interact with it via APIs.
It's intended to encapsulate all user-related items associated with a print
job, to allow clients to preserve it between jobs or documents, as well as
set and retrieve individual attributes.
*/
class AGMPrintClientItems;
#else /* __cplusplus */
typedef struct __t__AGMPrintClientItems AGMPrintClientItems;
#endif/* __cplusplus */
/* AGMPrintClientItemsGet/Set provide communication with the AGMPrintClientItems
opaque object.
The "itemID"is a selector for the set of all possible types of data to get/set. Each of
these types must have an associated "itemVal", which is a pointer to the appropriate data
type. "data" is optional, applying to certain selectors, and is typically used to set or get an
associated state.
Here are the details:
itemID: itemVal: data:<desc><(values)><comments>
kAGMPrtClntItmsInk AGMPrintInk reset flag (!0) - for "set", ignore
ink index (0 - (#of inks - 1)) -
Comments: Inks used in the job, for separation purposes. (See additional notes with
AGMPrintInk,
kAGMPrtClntItmsInkUnused AGMPrintInk N/A
Comments: Mark a previously registered ink as unused. (See additional notes with
AGMPrintInk,
Note: "set" only.
kAGMPrtClntItmsExportFormat AGMPrintExportFormat N/A
Comments: Exporting the print stream vs. printing direct.
kAGMPrtClntItmsPSExportOpts AGMPrintPSExportOptions N/A
Comments: Options associated with exporting the PS stream to the client vs. the printer.
kAGMPrtClntItmsPSDefClrSpace AGMPrintPSDefColorSpace N/A
Comments: PS default color space.
kAGMPrtClntItmsBMSmplg AGMPrintBitmapSampling N/A
Comments: Bitmap sampling user choice.
kAGMPrtClntItmsDocName char[PS_FILE_NAME_MAX] N/A
Comments: Document name.
kAGMPrtClntItmsDocInfo AGMPrintDocumentInfo N/A
Comments: Document information (e.g. name, creation date).
kAGMPrtClntItmsRdrSprd AGMPrintReaderSpread N/A [OBSOLETE. see . . .
RdrSpread]
Comments: Reader spread associated with the print job.
kAGMPrtClntItmsPgSect AGMPrintPageSection reset flag (!0) - for "set"; section
Comments: Sections of pages in document.
kAGMPrtClntItmsBleed float (0–72 pts.) N/A
Comments: Page bleed amount.
kAGMPrtClntItmsXparency Bool32 (0|1) N/A
Comments: Whether document contains transparent objects (currently unused)
kAGMPrtClntItmsPgRange AGMPrintPageRange reset flag (!0) - for "set"; range
Comments: Document page ranges to print.
kAGMPrtClntItmsPgNumOrdinalMode Bool32 (0|1) N/A
Comments: Display page numbers in UI as ordinal values when true.
kAGMPrtClntItmsPgRangeUICoOp AGMPrintPgRangeUICoOp N/A
Comments: Page range UI Client Participation attributes.
kAGMPrtClntItmsUseDIC Bool32 (0|1) N/A
Comments: Print device-independent colors as such vs. converting them to device spaces
on the
kAGMPrtClntItmsEmitCRDs Bool32 (0|1) N/A
Comments: Emit PS CRDs when printing with device-independent color.
kAGMPrtClntItmsColorState AGMPrintColorState N/A
Comments: Color state attributes (e.g. composite vs. seps).
```

TABLE 2-continued kAGMPrtClntItmsPlatformPrintRec PlatformTHPrint || N/A
PlatformDEVMODE
Comments: Platform-specific print record.
Note: Currently "get" only.
kAGMPrtClntItmsScalg AGMPrintScaling N/A
Comments: Page scaling info.
kAGMPrtClntItmsCtrImgArea Bool32 (0|1) N/A
Comments: Center page on target paper using center of imageable area, vs. paper itself.
kAGMPrtClntItmsUICoOpNotify AGMPrintUICoOp Get: index, Set: N/A
Comments: Print UI Client Participation attributes.
kAGMPrtClntItmsReverseOrder Bool32 (0|1) N/A
Comments: Are pages to be printed in reverse order?
kAGMPrtClntItmsPageMarks AGMPrintPageMarks N/A
Comments: page marks on/off status: all, crops, bleeds, page info, registration, color bars
kAGMPrtClntItmsEvenOdd AGMPrintEvenOddPages N/A
Comments: Both pages, even pages only, or odd pages only
kAGMPrtClntItmsMeasSystem AGMPrintMeasSystem N/A
Comments: Measurement system type: points, inches, picas, cm, mm . . .
kAGMPrtClntItmsOrientation AGMPrintOrientation N/A
Comments: Portrait, landscape, etc.
kAGMPrtClntItmsTiling AGMPrintTiling N/A
Comments: tiling options and overlap value
kAGMPrtClntItmsImgReplace Bool32 (0|1) N/A
COmments: OPI/DCS image replace
kAGMPrtClntItmsProof Bool32 (0|1) N/A
Comments: produce proof copy (what is included in output is up to the client)
kAGMPrtClntItmsTrapping Bool32 (0|1) N/A
Comments: doc level trapping on/off control
kAGMPrtClntItmsTrapStyle AGMPrintTrapStyle reset flag (!0) - for "set", ignore
Comments: trapping style definition trapStyle index (0 - (#of styles
kAGMPrtClntItmsTrapZone AGMPrintTrapZone for "set", reset flag (−1|0|1),
1 = ignore all previously registered
Comments: trapping zone definitions for "get", reset flag (>= −1), −1
(see Note); otherwise, trapZone index
Note: For "get", this item allocates memory for the pgRanges field, from client items'
memory
for freeing this memory be using this selector again with data set to −1.
kAGMPrtClntItmsPSHalftoningOpts AGMPrintPSHalftoningOpts N/A
Comments: PostScript halftoning options
kAGMPrtClntItmsPSOptScreens AGMPrintPSOptScreens N/A
Comments: PostScript optimal screening sets for separations, retrieval from current PPD
Note: "get" only.
kAGMPrtClntItmsPSGradientOpts AGMPrintPSGradientOpts N/A
Comments: PostScript gradient printing options.
kAGMPrtClntItmsFontDownloadOpts AGMPrintFontDownloadOpts N/A
Comments: Font download options - subset, wholecloth, and none.
kAGMPrtClntItmsPagesMode AGMPrintPagesMode N/A
Comments: print pages mode: all, ranges, bySection
kAGMPrtClntItmsPrinterChgd AGMPrinterChange prtr name and flag to throw away
Comments: Target printer has changed. AGM updates internal state as necessary. If client wants
data, it should use kAGMPrtClntItmsPrinterSpcfcData first (in "get" mode) to fetch the data,
mode to reset the data if original printer is restored. itemVal of 0 is no-op.
Note: "set" only.
kAGMPrtClntItmsPrinterSpcfcData void ** flag to throw away the printer-specific
Comments: For use in conjunction with kAGMPrtClntItmsPrinterChgd, to save/restore
printer-specific
occurs. item Val is opaque ptr to ptr, which is set to data affected by a printer change
during
back on "set".
kAGMPrtClntItmsPSInRIPSepsOK Bool 32 (0|1) N/A
Comments: Are in-RIP seps allowed on this PS device?
Note: "get" only.
kAGMPrtClntItmsPSInRIPTrappingOK Bool32 (0|1) N/A
Comments: Is in-RIP trapping allowed on this PS device?
Note: "get" only.
kAGMPrtClntItmsRdrSpread AGMPrintRdrSpread for "set", one of(−1|0|1),
Comments: reader spread definitions 1 = start setting reader spreads.
"item" is ignored in this
−1 = set attributes of doc default
0 = set island/exception spread
for "get", rdrSpread index (0 - (#
kAGMPrtClntItmsRdrSpreadStatus Bool32 (0|1) N/A
Comments: used by UI code
*/
AGMPrintError AGMEXPORT AGMPrintClientItemsGet (
    AGMPrintClientItems *ci, /* client's previously-built client items object */
    AGMPrintClientItemsID itemID, /* selector for item to get data on */

TABLE 2-continued

```
    int32 data, /* see notes above */
    void *itemVal /* result */
);
AGMPrintError AGMEXPORT AGMPrintClientItemsSet (
    AGMPrintClientItems *ci, /* client's previously-built client items object */
    AGMPrintClientItemsID itemID, /* selector for item to set data on */
    int32 data, /* see notes above */
    void *itemVal /* result */
);
/* create client items object, encapsulation of all client attributes of print job */
AGMPrintError AGMEXPORT AGMPrintClientItemsCreate (
    AGMPrintClientItems **ci, /* returned client items object when result is
kAGMPrtErrSuccess */
    AGMMemObj* mem /* client-provided memory for dynamic allocations */
);
/* destroy client items object */
void AGMEXPORT AGMPrintClientItemsDestroy (
    AGMPrintClientItems *ci /* client's previously-built client items object */
);
/* Preserve client items object to the provided stream. Client is responsible for
details of stream target.
*/
AGMPrintError AGMEXPORT AGMPrintClientItemsSave (
    AGMPrintClientItems *ci /* client's previously-built client items object */
    AGMStream *stream /* client stream to write data to */
);
/* restore client items object from previous print session, from client provided stream
*/
AGMPrintError AGMEXPORT AGMPrintClientItemsRestore (
    AGMPrintClientItems **ci, /* returned client items object when result is
kAGMPrtErrSuccess */
    AGMStream *stream, /* client stream to read data from */
    AGMMemObj* mem /* client-provided memory for dynamic allocations */
);
/* -------------------- print object data and APIs ------------------- */
/* device types (kAGMPrtObjectItmsDeviceType) */
typedef uint32 AGMDeviceType;
enum {
    kAGMPPostScript,
    kAGMPQuickdraw,
    kAGMPGDI,
    kAGMPPrintGear,
    kAGMPPDF,
    kAGMPRasterDevice
};
/* print object item ids (for use with AGMPrintObjectGet/Set) */
typedef uint32 AGMPrintObjectItemID;
enum {
    kAGMPrtObjectItmsFontSrvr,
    kAGMPrtObjectItmsDevProf,
    kAGMPrtObjectItmsPaintSrvr,
    kAGMPrtObjectItmsPSExportStrms,
    kAGMPrtObjectItmsPtrFont,
    kAGMPrtObjectItmsCurrentSep,
    kAGMPrtObjectItmsDeviceType,
    kAGMPrtObjectItmsPgMarksFont,
    kAGMPrtObjectItmsDevRes,
    kAGMPrtObjectItmsMaxPageSize,
    kAGMPrtObjectItmsMaxRdrSpreadSize
};
#ifdef __cplusplus
/* AGMPrintObject is also opaque to clients. They interact with it via APIs.
It's intended to encapsulate all non-user related printing attributes.
Its lifetime is the current print job only.
*/
class AGMPrintObject;
#else /* __cplusplus */
typedef struct __t_AGMPrintObject AGMPrintObject;
#endif /* __cplusplus */
/* AGMPrintObjectSet/Get provide communication with the AGMPrintObject opaque
object.
The "itemID" is a selector for the set of all possible types of data to set. Each of
these types must have an associated "item Val", which is a pointer to the appropriate data
type. "data" is optional, applying to certain selectors, and is typically used to set an
associated state.
Here are the details:
itemID: itemVal: data:<desc><(values)><comments>
kAGMPrtObjectItmsFontSrvr AGMFontServer N/A
Comments: Register the font server (e.g. CoolType) used in the PS job (ignored for non-
```

TABLE 2-continued

```
PS jobs).
kAGMPrtObjectItmsDevProf AGMColorProfile N/A
Comments: Register a profile group for the job.
kAGMPrtObjectItmsPaintSrvr AGMPaintServer N/A
Comments: Register paint servers for the PS job (ignored for non-PS jobs). E.g. A
gradiant server.
kAGMPrtObjectItmsPSExportStrms AGMPrintPSExportStreams N/A
Comments: Register streams for a PS job when exporting vs. printing (see related
kAGMPrtClntItmsExportFormat
and kAGMPrtClntItmsPSExportOpts selectors with AGMPrintClientItems).
kAGMPrtObjectItmsPtrFont Bool32 (0|1) fontname (null-terminated)
Comments: Fetch whether requested font resides on target printer.
Note: Currently "get" only.
kAGMPrtObjectItmsCurrentSep AGMPrintInk N/A
Comments: Fetch current sep info when AGMPrintColorStateType is
kAGMPrtCSOnHostSeps. Not defined
for other AGMPrintColorStateType vals.
Note: Currently "get" only.
kAGMPrtObjectItmsDeviceType AGMDeviceType N/A
Comments: Fetch device type (kAGMPPostScript, etc.)
Note: "get" only.
kAGMPrtObjectItmsPgMarksFont CTFontDict N/A
Comments: Register the font object (e.g. CoolType) used for page marks' labels.
(See additional comments with AGMPrintObjectItemID above.)
kAGMPrtObjectItmsDevRes float N/A
Comments: Fetch device resolution.
Note: "get" only.
kAGMPrtObjectItmsMaxPageSize AGMFloatRect N/A
Comments: Fetch maximum page size
Note: "get" only.
kAGMPrtObjectItmsMaxRdrSpreadSize AGMFloatRect N/A
Comments: Fetch maximum reader spread size
Note: "get" only.
*/
AGMPrintError AGMEXPORT AGMPrintObjectGet (
    AGMPrintObject *po, /* client's previously-built print object */
    AGMPrintObjectItemID itemID, /* selector for item to get data on */
    int32 data, /* see notes above */
    void *itemVal /* result */
);
AGMPrintError AGMEXPORT AGMPrintObjectSet (
    AGMPrintObject *po /* client's previously-built print object */
    AGMPrintObjectItemID itemID, /* selector for item to set data on */
    int32 data, /* see notes above */
    void *itemVal /* result */
);
/* ---------------------- print event data and APIs ---------------------- */
/* event ids */
typedef uint32 AGMPrintEventID;
enum {
    kAGMPrtEvtDraw, /* draw page, both normal and spreads */
    kAGMPrtEvtEndPrinting, /* done with all printing */
    kAGMPrtEvtDrawMasterPage,/* draw master page content */
    kAGMPrtEvtBeginPage /* notification of beginning of page */
};
/* print event generated by AGMGetNextPrintEvent.*/
typedef struct __t_AGMPrintEvent {
    AGMPrintEventID id; /* event id */
    AGMPortPtr targetPort; /* port to print to */
    void *data; /* event-specific data - see usage below */
    /* Note: the memory is supplied and owned by AGM. */
} AGMPrintEvent;
/* print event data usage
    AGMPrintEventID: data:
    kAGMPrtEvtDraw AGMPrintPageRange
    kAGMPrtEvtEndPrinting N/A
    kAGMPrtEvtDrawMasterPage AGMPrintPageRange
    kAGMPrtEvtBeginPage AGMPrintPageRange
*/
/* fetch next print event */
AGMPrintError AGMEXPORT AGMGetNextPrintEvent (
    AGMPrintObject *po, /* client's previously-built print object */
    AGMPrintEvent *evt /* event for client to respond to */
);
/* ---------------------- general printing data and APIs ----------------------*/
/* progress callback - arg. to AGMInitPrinting
If this parameter is not null, AGM will call this function periodically
during generation of the document. Each time it is called it is told what
stage the document processing is in and the function must return true or false.
```

TABLE 2-continued

If it returns true processing will continue. If it returns false processing will stop.
*/
typedef Bool8 (AGMCALLBACK * PrintProcessProcPtr)(
    void* userData, /* passed to proc every time AGM calls it. Not interpreted by AGM.
*/
    long process, /* one of constants defined below */
    void* processInfo1, /* process-specific info - see usage below */
    long processInfo2 /* process-specific info - see usage below */
);
/* possible progress constants */
enum {
    kAGMPPopLastProgress,
    kAGMPPushCompilingDocumentResources,
    kAGMPPushCompilingPageResources,
    kAGMPPushStreamingDocumentFont,
    kAGMPPushStreamingDocumentResource,
    kAGMPPushStreamingPageFont,
    kAGMPPushStreamingPageResource,
    kAGMPPushStreamingPageContent,
    kAGMPPushStreamingPageEpilogue,
    kAGMPPushStreamingDocumentEpilogue,
    kAGMPPushStreamingDocumentProcset,
    kAGMPPushStreamingPageSeparation,
    kAGMPPushStreamingPageImage,
    kAGMPPushStreamingPageImageOPI,
    kAGMPPushStreamingPageCSA,
    kAGMPPushStreamingPageCRD,
    kAGMPPushStreamingPageGradient
};
/* progress constant usage
    kAGMPPushCompilingDocumentResources:
    This typically happens during the first pass of a two pass
    process. It is compiling the description of resources that
    are used by the entire document. For this call:
    processInfo1 = 0
    processInfo2 = 0
kAGMPPushCompilingPageResources
    This typically happens during the first pass of a two pass
    process. It is compiling the description of resources that
    are used by a particular page. For this call:
    processInfo1 = current page number
    processInfo2 = 0
kAGMPPushStreamingDocumentFont
    It is sending out a description of a font that will be used
    across the entire document. For this call:
    processInfo1 = name of font (a C string)
    processInfo2 = 0
kAGMPPushStreamingDocumentResource
    It is sending out a non-font resource that is used across
    the entire document. For this call:
    processInfo1 = name of resource (a C string), or null if no name exists
    processInfo2 = 0
kAGMPPushStreamingPageFont
    It is sending a description of a font that is used on this
    page only. For this call:
    processInfo1 = name of font (a C string)
    processInfo2 = 0
kAGMPPushStreamingPageResource
    It is sending out a non-font resource that is used for
    this page only. For this call:
    processInfo1 = name of resource (a C string), or null if no name exists
    processInfo2 = current page number
kAGMPPushStreamingPageContent
    It is sending out the description of a page. For this call:
    processInfo1 = current page number
    processInfo2 = 0
kAGMPPushStreamingPageEpilogue
    It is sending things that go at the end of a page (like
    showpage stuff). For this call:
    processInfo1 = current page number
    processInfo2 = 0
kAGMPPushStreamingDocumentEpilogue
    It is sending things that go at the end of a document. For
    this call:
    processInfo1 = 0
    processInfo2 = 0
kAGMPPushStreamingDocumentProcset
    It is sending out a procset needed by the document. For this call:
    processInfo1 = 0 or filename (if procset is external)

TABLE 2-continued

```
    processInfo2 = procset ID (PSDictID)
kAGMPPushStreamingPageSeparation
    It is beginning a separation. For this call:
    processInfo1 = current plate name (char *, PS_INK_NAME_MAX chars)
    processInfo2 = current page number
kAGMPPushStreamingPageImage
    It is sending out the description of an image. For this call:
    processInfo1 = AGMImageRecord pointer
    processInfo2 = 0
kAGMPPushStreamingPageImageOPI
    It is sending out the description of an OPI image. For this call:
    processInfo1 = AGMImageRecord pointer
    processInfo2 = 0
kAGMPPushStreamingPageCSA
    It is sending out the description of a color space. For this call:
    processInfo1 = AGMColorSpace pointer
    processInfo2 = 0
kAGMPPushStreamingPageCRD
    It is sending out the description of a color rendering dictionary.
    For this call:
    processInfo1 = AGMColorProfile pointer
    processInfo2 = CRD index
kAGMPPushStreamingPageGradient
    It is sending out the description of a color gradient.
    For this call:
    processInfo1 = 0
    processInfo2 = 0
    userData - void*. This parameter is passed to the 'progress' proc
    every time AGM calls it. It is not interpreted by AGM.
*/
/* initialize printing */
AGMPrintError AGMEXPORT AGMInitPrinting (
    AGMPrintClientItems *ci, /* client's previously-built client items object */
    AGMMemObj* mem, /* client-provided memory for dynamic allocations */
    PrintProgressProcPtr progress. /* progress proc - see above */
    void* userData. /* user data for progress proc - see above */
    AGMPrintObject **po, /* returned print object when result is kAGMPrtErrSuccess */
    uint32 provideUI /* does client want UI services? */
);
void AGMEXPORT AGMEndPrinting (
    AGMPrintObject *po /* print object constructed by AGMInitPrinting */
);
/* Host the platform-dependent page setup UI. This is supplied to let our printing model
support
the Mac's model that shares a printing record between the printing UI and the page setup
UI.
Clients can use this to access driver UI features such as the target paper size that are only
accessable via the Mac's page setup UI. which this API sits atop.
This API is currently unsupported on the PC (returns kAGMPrtErrInvldEntrance).
*/
AGMPrintError AGMEXPORT AGMPrintPageSetupUI (
    AGMPrintClientItems *ci /* client's previously-built client items object */
);
/* undo the Metrowerks pragma */
#if defined(MAC_ENV) && defined(__MWERKS__) && !defined(powerc)
#pragma pointers_in_A0
#endif
#ifdef__cplusplus
}
#endif
#endif
```

The print manager may be implemented in a host computer or as part of a printer accessed via the operating system of a computer system. The print manager can be implemented to communicate with the client application directly or through an intermediary such as a remote server. The print manager can be implemented as a separate "layer" operating on top of the operating system, interposed between client applications and the operating system. Alternatively, the print manager can be implemented as a component of the operating system of the computer system. Thus, the print manager can be implemented as an integrated part of the operating system or as a distinct program through which client applications access print services of the computer system. In addition, the print manager and the client application can execute as processes on different processors, such as across a network.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

In one implementation, a computer system includes a processor, a random access memory (RAM), a program memory (for example, a writable read-only memory (ROM) such as a flash ROM), a hard drive controller, a video controller, and an input/output (I/O) controller coupled by a processor (CPU) bus. The system can be preprogrammed, in ROM, for example, or it can be programmed (and reprogrammed) by loading a program from another source (for example, from a floppy disk, a CD-ROM, or another computer). The hard drive controller is coupled to a hard disk suitable for storing executable computer programs, including programs embodying the present invention, and data including. The video controller is coupled to a video recorder, which can be used for storing and importing video footage and for writing final output. The I/O controller is coupled by means of an I/O bus to an I/O interface. The I/O interface receives and transmits data (e.g., stills, pictures, movies, and animations for importing into a composition) in analog or digital form over communication links such as a serial link, local area network, wireless link, and parallel link. Also coupled to the I/O bus is a display and a keyboard. Alternatively, separate connections (separate buses) can be used for the I/O interface, display and keyboard.

The invention has been described in terms of particular embodiments. Other embodiments are within the scope of the following claims. For example, the steps of the invention can be performed in a different order and still achieve desirable results. The technique can be applied to a variety of programming environments, such as C++ or LISP. The control of printing call be interrupt-driven by the print manager. The print manager can be implemented as part of an operating system or as a separate layer between the operating system and application programs. The print driver can be included as part of the print manager. The user interface can be implemented as part of the operating system or within the client application. The client application can use the user interface supplied by the print manager and can suppress part or all of that user interface, providing another implementation within the client application. The print initialization message can include a reference to an attribute list to be used in the ensuing print session so that the client application can select which attribute list to use. Attributes can be included with the print initialization message to be added to the attribute list or to create a new attribute list. The client application can inform the print manager of the nature of the client application's response to a print event. The client application can access information for optimization directly using print manager routines. The print manager can check whether requested data has been supplied by the client application. For some print services, active print service components can recognize when print data received from the client application does not need to be changed by print parameters, such as when the client application has optimized its response sufficiently.

What is claimed is:

1. A method of printing to a destination, the method comprising:
    receiving from a client application a request for one or more print services;
    activating a print service component that implements a specific print service;
    generating print events to provide the specific print service to the client application, where the print events request information from the client application according to the specific print service; and
    receiving responses to the print events from the client application, where at least one response includes print data to be printed to a destination.

2. The method of claim 1, where the destination is a printer.

3. The method of claim 1, further comprising receiving a selection of a destination.

4. The method of claim 1, further comprising receiving a selection of the specific print service.

5. The method of claim 1, where the print events are implemented as print event records.

6. The method of claim 1, further comprising generating at least one print parameter according to the specific print service, where the print parameters are used with the print data to provide the specific print service.

7. The method of claim 1, where activating a print service component includes creating an instance of a print service component object.

8. The method of claim 1, further comprising modifying the received print data according to the specific print service.

9. The method of claim 1, wherein the print event includes optimization information for the client application to use in responding to the print event.

10. The method of claim 1, further comprising receiving a registration from the client application.

11. The method of claim 10, wherein the registration includes an attribute indicating the specific print service provided by a print manager.

12. The method of claim 1, wherein the specific print service is tile printing.

13. The method of claim 1, wherein the specific print service is color separations.

14. The method of claim 1, wherein the specific print service is master pages.

15. The method of claim 1, further comprising waiting for a print initialization message from the client application prior to generating print events.

16. The method of claim 1, wherein receiving from a client application a request for one or more print services includes receiving a print initialization message from the client application to initialize a print session.

17. The method of claim 16, where the print initialization message indicates a print session parameter for generating the print events.

18. The method of claim 1, further comprising sending the print event to the client application.

19. The method of claim 1, further comprising sending a termination print event to the client application to terminate a print session.

20. The method of claim 1, further comprising receiving at termination message from the client application when the client application has completed print processing.

21. A method of requesting print services from a print manager in a computer system, the method comprising:
    initializing a print session to print to a destination by sending a print initialization message from a client application to a print manager that is configured to activate a print service component implementing a specific print service;
    receiving a print event generated by the print manager, the print event requesting information from the client application according to the specific print service; and
    responding to the received print event by supplying to the print manager print data to be printed to the destination.

22. The method of claim 21, where the destination is a printer.

23. The method of claim 21, further comprising waiting for a print event from the print manager.

24. The method of claim 23, where the waiting for a print event is in a print event loop.

25. The method of claim 21, further comprising registering with a the print manager.

26. The method of claim 25, wherein the registering includes sending an attribute to the print manager indicating the specific print service to be provided by the print manager.

27. The method of claim 26, wherein the specific print service is tile printing.

28. The method of claim 26, wherein the print event is generated by the print manager according to the registered attribute.

29. The method of claim 26, wherein the attribute selects the destination.

30. The method of claim 21, wherein the print initialization message includes print session parameters to be used by the print manager in generating a print event.

31. The method of claim 21, wherein the responding to the print event includes taking no action indicating the print event is not supported.

32. The method of claim 21, wherein the responding to the print event includes failing to respond indicating the print event is not supported.

33. The method of claim 21, wherein said responding to the print event includes sending a termination message to the print manager to terminate the print session.

34. The method of claim 21, further comprising optimizing the print data using information received with the print event.

35. A method of providing a specific print service to a client application, the method comprising:
    registering a client application with a print manager;
    registering one or more attributes with the print manager, where at least one attribute indicates a specific print service to be provided by the print manager;
    receiving a request to initialize a print session, the request specifying one or more print session parameters;
    activating a print service component that implements the specific print service;
    generating a print event according to the print session parameters and the registered attributes, where the print event requests information from the client application according to the specific print service to be provided by the print manager;
    generating at least one print parameter according to the specific print service to be provided by the print manager;
    sending the print event to the client application;
    if the client application supports the print event, responding to the print event by supplying print data to be printed to the print manager, where the print manager supplies the print data and each print parameter to a destination;
    determining whether the print session is complete;
    sending a termination print event to the client application; and
    terminating the print session.

36. The method of claim 35, wherein if the client application does not support the print event, the client application responds to the print event indicating to the print manager that the client application does not support the print event.

37. The method of claim 35, wherein the print manager modifies the supplied print data according to the registered attributes and print session parameters to provide one or more specific print services and supplies the modified print data to the destination.

38. The method of claim 35, where the destination is a printer.

39. The method of claim 35, wherein the print manager executes as a process independent of a process executing the client application, and the print manager sends print events through an inter-process communication facility.

40. A computer program implementing a print manager, where the computer program is stored on a computer-readable medium, the computer program including instructions operable to cause a computer to:
    receive from a client application a request for one or more print services;
    activate a print service component that implements the specific print service;
    generate print events to provide the specific print service to the client application, where the print events request information form the client application according to the specific print service; and
    receive responses to the print events from the client application, where at least one response includes print data to be printed to a destination.

41. The computer program of claim 40, where the print manager executes as a process independent of a process executing the client application, and the print manager sends print events through an inter-process communication facility.

42. The computer program of claim 40, where the print manager executes as a process on a processor within a printer.

43. The computer program of claim 40, where the print manager is defined within an operating system.

44. The computer program of claim 40, where the print manager is independent of an operating system.

45. The computer program of claim 40, where the print manager is defined in a separate software component from the client application.

46. A computer program implementing a client application for requesting print services from a print manager, where the computer program is stored on a computer-readable medium, the computer program including instructions operable to cause a computer to:

- initialize a print session to print to a destination by sending a print initialization message from the client application to a print manager that is configured to activate a print service component implementing a specific print service;
- receive a print event generated by the print manager, the print event requesting information from the client application according to the specific print service; and
- respond to the received print event by supplying to the print manager print data to be printed to a destination.

47. The computer program of claim 46, where the print manager executes as a process independent of a process executing the client application, and the print manager sends print events through an inter-process communication facility.

48. The computer program of claim 46, where the print manager executes as a process on a processor within a printer.

49. The computer program of claim 46, where the print manager is defined within an operating system.

50. The computer program of claim 46, where the print manager is independent of an operating system.

51. The computer program of claim 46, where the print manager is defined in a separate software component from the client application.

52. A computer program stored on a computer-readable medium, embodying an event-based printing architecture, the printing architecture comprising:

- a client application, where the client application requests a specific print service and supplies print data to be printed in response to print events; and
- a print manager, where the print manager receives the client application, activates a print service component that implements the specific print service, sends print events to the client application to request print data according to the specific print service, receives the print data from the client application in response to the print events, uses the received print data, and provides the specific print service.

53. A computer-implemented system for printing, comprising:

- means for receiving from a client application a request for one or more print services;
- means for activating a specific print service component;
- means for generating print events to provide the specific print service to the client application, where the print events request information from the client application according to the specific print service; and
- means for receiving responses to the print events from the client application, where at least one response includes print data to be printed.

* * * * *

UNITED STATES PATENT AND TRADEMARK OFFICE
CERTIFICATE OF CORRECTION

PATENT NO. : 6,738,152 B1
DATED : May 18, 2004
INVENTOR(S) : Paul Holland and Tim H. Roth It is certified that error appears in the above-identified patent and that said Letters Patent is hereby corrected as shown below:

<u>Title page,</u>
Item [73], Assignee, replace "Adobe Systems, Incorporated" with -- Adobe Systems Incorporated --

<u>Column 43,</u>
Line 30, replace "with a the print manager" with -- with the print manager --

<u>Column 44,</u>
Line 46, replace "information form the client application" with -- information from the client application --

Signed and Sealed this

Second Day of November, 2004

JON W. DUDAS
*Director of the United States Patent and Trademark Office*